US 9,176,296 B2

(12) United States Patent
Sasaki et al.

(10) Patent No.: US 9,176,296 B2
(45) Date of Patent: Nov. 3, 2015

(54) LENS SYSTEM AND CAMERA SYSTEM

(71) Applicant: FUJIFILM Corporation, Tokyo (JP)

(72) Inventors: Tadashi Sasaki, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 14/229,382

(22) Filed: Mar. 28, 2014

(65) Prior Publication Data

US 2014/0211064 A1 Jul. 31, 2014

Related U.S. Application Data

(63) Continuation of application No. PCT/JP2012/073658, filed on Sep. 14, 2012.

(30) Foreign Application Priority Data

| Sep. 29, 2011 | (JP) | 2011-215637 |
| Sep. 29, 2011 | (JP) | 2011-215638 |
| Sep. 29, 2011 | (JP) | 2011-215639 |

(51) Int. Cl.
*G02B 7/02* (2006.01)
*G03B 5/06* (2006.01)
(Continued)

(52) U.S. Cl.
CPC .............. *G02B 7/023* (2013.01); *G02B 27/646* (2013.01); *G03B 5/06* (2013.01); *H04N 5/2355* (2013.01);
(Continued)

(58) Field of Classification Search
CPC ...... G02B 7/023; G02B 27/646; G02B 7/102; H04N 5/2355; H04N 5/23293; H04N 5/23219; H04N 5/23212; G03B 5/06; G03B 2205/0015; G03B 2205/0046; G03B 2205/0023
See application file for complete search history.

(56) References Cited

U.S. PATENT DOCUMENTS

| 5,392,082 A | 2/1995 | Ikemori et al. |
| 5,406,344 A | 4/1995 | Oshikiri et al. |

(Continued)

FOREIGN PATENT DOCUMENTS

| JP | 4-97325 A | 3/1992 |
| JP | 6-94958 A | 4/1994 |

(Continued)

OTHER PUBLICATIONS

International Search Report issued in PCT/JP2012/073658 mailed Nov. 6, 2012.

(Continued)

*Primary Examiner* — Twyler Haskins
*Assistant Examiner* — Padma Haliyur
(74) *Attorney, Agent, or Firm* — Birch, Stewart, Kolasch & Birch, LLP

(57) ABSTRACT

A lens system for a camera, includes: an image formation optical system including a movable lens group and a correction lens group; a drive section driving the correction lens group; a lens position acquisition section acquiring a lens position of the movable lens group; a specification section specifying a partial image of a part of region in an image; a storage section storing a data table; and a control section, in accordance with the lens position of the movable lens group acquired by the lens position acquisition section, on the basis of the data table, acquiring a position for the correction lens group that improves optical performance of the partial image specified by the specification section and then controlling the drive section such as to move the correction lens group to the acquired position.

19 Claims, 35 Drawing Sheets

(51) Int. Cl.
*G02B 27/64* (2006.01)
*H04N 5/232* (2006.01)
*H04N 5/235* (2006.01)
*G02B 7/10* (2006.01)

(52) U.S. Cl.
CPC ....... *H04N 5/23212* (2013.01); *H04N 5/23219* (2013.01); *H04N 5/23293* (2013.01); *G02B 7/102* (2013.01); *G03B 2205/0015* (2013.01); *G03B 2205/0023* (2013.01); *G03B 2205/0046* (2013.01)

(56) References Cited

U.S. PATENT DOCUMENTS

| | | | |
|---|---|---|---|
| 5,491,527 | A | 2/1996 | Oshikiri et al. |
| 5,781,808 | A * | 7/1998 | Sasaki ............... 396/81 |
| 2004/0184163 | A1 | 9/2004 | Nishioka et al. |
| 2007/0031134 | A1 * | 2/2007 | Kuroda et al. .......... 396/55 |
| 2008/0165271 | A1 | 7/2008 | Nakazawa et al. |
| 2009/0046366 | A1 * | 2/2009 | Take ................... 359/557 |
| 2010/0289908 | A1 * | 11/2010 | Ke ................... 348/208.6 |
| 2011/0019239 | A1 | 1/2011 | Kojima et al. |
| 2013/0170822 | A1 * | 7/2013 | Chan ................... 396/86 |

FOREIGN PATENT DOCUMENTS

| | | |
|---|---|---|
| JP | 6-95195 A | 4/1994 |
| JP | 2004-247947 A | 9/2004 |
| JP | 2005-328393 A | 11/2005 |
| JP | 2006-64986 A | 3/2006 |
| JP | 2008-170599 A | 7/2008 |
| JP | 2010-72092 A | 4/2010 |
| JP | 2010-237250 A | 10/2010 |
| JP | 2011-50038 A | 3/2011 |
| JP | 2011-90032 A | 5/2011 |

OTHER PUBLICATIONS

Written Opinion of the International Searching Authority issued in PCT/JP2012/073658 mailed Nov. 6, 2012.
Japanese Office Action dated Aug. 11, 2015, issued in corresponding Japanese Patent Application No. 2013-536173.

* cited by examiner

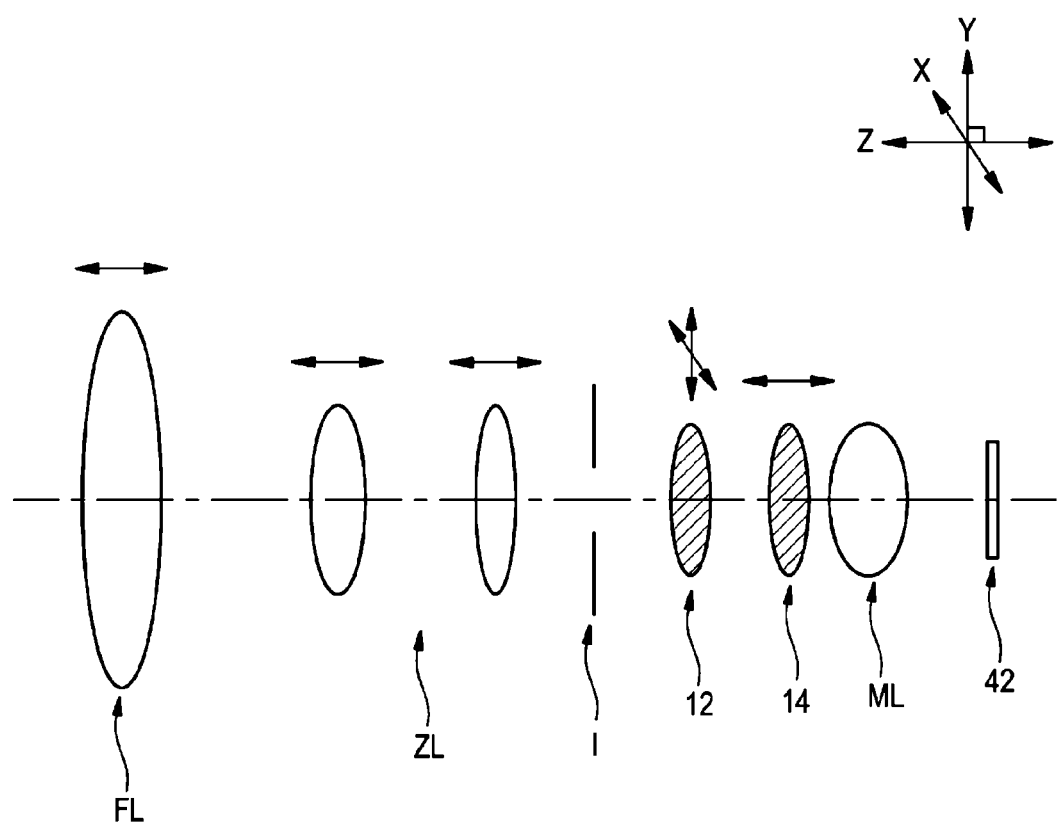

FIG. 3A

| FOCUS LENS GROUP | ZOOM LENS GROUP | DIAPHRAGM | DECENTERING CORRECTION LENS GROUP | RESOLUTION |
|---|---|---|---|---|
| a01 | b01 | c01 | d01 | x01 |
| a02 | b02 | c02 | d02 | x02 |
| a03 | b03 | c03 | d03 | x03 |
| ⋮ | ⋮ | ⋮ | ⋮ | ⋮ |

FIG. 3B

| FOCUS LENS GROUP | ZOOM LENS GROUP | DIAPHRAGM | TILT CORRECTION LENS GROUP | RESOLUTION |
|---|---|---|---|---|
| a01 | b01 | c01 | e01 | y01 |
| a02 | b02 | c02 | e02 | y02 |
| a03 | b03 | c03 | e03 | y03 |
| ⋮ | ⋮ | ⋮ | ⋮ | ⋮ |

CHART IMAGE BY CCD 32

| DECENTERING CORRECTION LENS GROUP | TILT CORRECTION LENS GROUP | CAMERA-SHAKE CORRECTION LENS GROUP |
|---|---|---|
| d01 | e01 | f01 |
| d02 | e02 | f02 |
| d03 | e03 | f03 |
| ⋮ | ⋮ | ⋮ |

LENS SYSTEM AND CAMERA SYSTEM

CROSS REFERENCE TO RELATED APPLICATIONS

This is a continuation of International Application No. PCT/JP2012/073658 filed on Sep. 14, 2012, and claims priority from Japanese Patent Application Nos. 2011-215637, filed on Sep. 29, 2011, 2011-215638, filed on Sep. 29, 2011, and 2011-215639, filed on Sep. 29, 2011, the entire disclosures of which are incorporated herein by reference.

TECHNICAL FIELD

The present invention relates to a lens system and a camera system.

BACKGROUND ART

Presently, researches on high-definition video systems such as super Hi-Vision are on-going. Then, in image pick-up using a high-definition video system, a camera is employed that has a high resolution such as 4 k (the number of pixels is horizontal 4096×vertical 2160) and 8 k (the number of pixels is horizontal 8192×vertical 4320).

In cameras of high resolution, for the purpose of achieving high-image quality, assembly errors are requested to be small in each lens group. In general, in lens groups, errors in each lens group are adjusted after the assembly, and adjustment is performed such as to avoid image degradation caused by variations in the inside of each lens group and between lens groups. Nevertheless, in cameras having been assembled, at the time of image pick-up, when a change occurs in the conditions of the optical system such as the position of a movable lens group, decentering could arise that is an assembly error in each lens group. This is because the degree of influence of aberration to decentering of each lens group varies depending on the conditions of the optical system.

Thus, an imaging device is disclosed in Patent Literature 1 in which at the time of image pick-up, on the basis of the conditions of a movable lens group, a decentering lens group is driven and decentered relative to the optical axis of the movable lens group so that image quality is adjusted.

CITATION LIST

Patent Literature

Patent Literature 1: JP-A-2010-237250

SUMMARY OF INVENTION

Technical Problem

Meanwhile, presently, investigation is performed on a technique that in a camera system employing a camera of high resolution, on the screen displaying an image acquired by image pick-up, a screen part corresponding to a camera of resolution of 2 k (the number of pixels is horizontal 2048×vertical 1080) or the like is cut out so that trimming, electronic zoom, and the like are achieved.

Nevertheless, there is a general tendency for optical performance to be high in the center of a pick-up image and low in the periphery of the image in comparison with the center. Thus, when the image of a predetermined area in the image acquired by image pick-up is used by trimming, electronic zoom, or the like, a possibility arises that the optical performance of the area is lower than the optical performance of other areas of the image.

Patent Literature 1 completely lacks the description that a part of areas in the entire screen is used and how the optical performance of the area is improved.

The present invention has been devised in view of the above-mentioned situations. An object thereof is to provide a lens system and a camera system in which at the time of image taking, on the basis of the conditions of the optical system such as a movable lens group, the image quality of an image of a part of areas in an entire screen can be adjusted.

Solution to Problem (1) A lens system for a camera, includes: an image formation optical system including a movable lens group and a correction lens group whose position relative to an optical axis is changed so that optical performance of each portion of an image is corrected;
a drive section driving the correction lens group; a lens position acquisition section acquiring a lens position of the movable lens group; a specification section specifying a partial image of a part of region in the image; a storage section storing a data table in which correspondence is established between position information of both of the movable lens group and the correction lens group and the optical performance of each portion of the image; and a control section, in accordance with the lens position of the movable lens group acquired by the lens position acquisition section, on the basis of the data table, acquiring a position for the correction lens group that improves the optical performance of the partial image specified by the specification section and then controlling the drive section such as to move the correction lens group to the acquired position.

(2) A camera system includes a lens device and a camera body, in which the lens device includes: an image formation optical system including a movable lens group and a correction lens group whose position relative to an optical axis is changed so that optical performance of each portion of an image is corrected; and a drive section driving the correction lens group; and a lens position acquisition section acquiring a lens position of the movable lens group, and in which the camera body includes: an image capturing element acquiring the image formed by imaging performed by the image formation optical system; a specification section specifying a partial image of a part of region in the image acquired by the image capturing element; a storage section storing a data table in which correspondence is established between position information of both of the movable lens group and the correction lens group and the optical performance of each portion of the image; and a control section, in accordance with the lens position of the movable lens group acquired by the lens position acquisition section, on the basis of the data table, acquiring a position for the correction lens group that improves the optical performance of the partial image specified by the specification section and then controlling the drive section such as to move the correction lens group to the acquired position.

Advantageous Effects of Invention

According to the present invention, a lens system and a camera system can be provided in which at the time of image taking, on the basis of the conditions of the optical system such as a movable lens group, the image quality of an image of a part of areas in an entire screen can be adjusted.

BRIEF DESCRIPTION OF DRAWINGS

FIG. 2 is a diagram schematically showing an optical system of a camera system.

FIGS. 3A and 3B are diagrams showing data structures of data tables stored in a storage section of a lens device.

DESCRIPTION OF EMBODIMENTS

Figure 1:
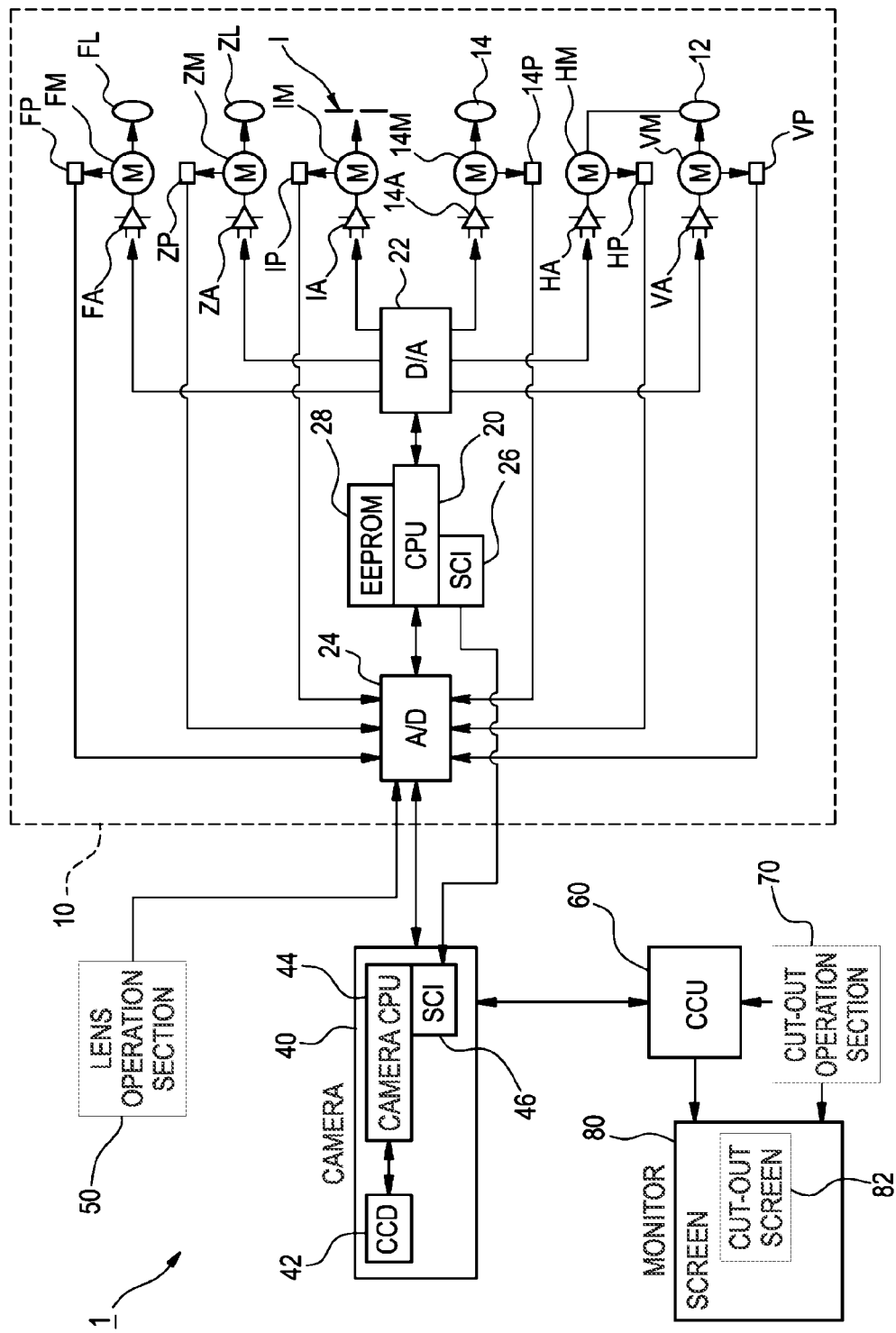
FIG. 1 is a block diagram showing a main configuration of a camera system.

FIG. 1 is a block diagram showing a main configuration of a camera system. FIG. 2 is a diagram schematically showing an optical system of a lens device used in the camera system.

As shown in FIG. 1, the camera system 1 includes a lens device 10 and a camera body 40.

For example, the lens device 10 is a lens device such as an EFP lens and an ENG lens used for broadcasting. The lens device 10 includes: an image-taking lens (an optical system) attached to the camera body 40 through a mount; and a control system for controlling the optical system.

The optical system of the lens device 10 is an image formation optical system for forming an image of a photographic object onto the imaging surface of an image capturing element 42 of the camera body 40. In the optical system, a focus lens group FL, a zoom lens group ZL, a diaphragm I, a decentering correction lens group 12, a tilt correction lens group 14, and a master lens group ML are provided in this order from the photographic object side.

The focus lens group FL moves in the optical axis direction so that the photographic object distance is changed. The zoom lens group ZL moves in the optical axis direction so that the focal length is changed. The diaphragm I is driven open or closed so that the diaphragm aperture is changed and hence the diaphragm value is changed. Here, lens groups such as the focus lens group FL and the zoom lens group ZL whose positions can be moved in accordance with the image-taking condition are collectively referred to as a movable lens group.

The decentering correction lens group 12 moves in a plane perpendicular to the optical axis direction (a plane parallel to the X-Y plane in FIG. 2). The tilt correction lens group 14 moves in parallel to the optical axis direction (the Z-direction in FIG. 2). The decentering correction lens group 12 is driven and controlled such as to adjust the center position of the image formed in the imaging surface of the image capturing element 42. The tilt correction lens group 14 is driven and controlled such as to improve the optical performance such as the resolution in the entire image formed in the imaging surface. The decentering correction lens group 12 and the tilt correction lens group 14 are collectively referred to as a correction lens group.

The control system of the lens device 10 includes a CPU 20, an EEPROM 28, amplifiers FA, ZA, IA, HA, VA, and 14A, motors FM, ZM, IM, HM, VM, and 14M, and potentiometers FP, ZP, IP, HP, VP, and 14P.

Further, a lens operation section 50, the camera body 40, a camera control unit (CCU) 60, a cut-out operation section 70, and a monitor 80 connected as external devices to the lens device 10 constitute a control system in the entirety of the lens system.

The camera body 40 includes: the image capturing element 42 onto which image is formed by the optical system of the lens device 10; and a camera CPU 44 for comprehensively controlling the processing sections in the inside of the camera body 40 that perform driving of the image capturing element 42, communication with the lens device 10, and the like. The image capturing element 42 is a CCD.

The CPU 20 of the lens device 10 is a control section for comprehensively performing lens control on the focus lens group FL, the zoom lens group ZL, and the like.

The EEPROM 28 is a storage section for storing various kinds of data concerning the operation of the lens device 10.

The CPU 20 outputs driving signals through a D/A converter 22 respectively to the amplifiers FA, ZA, and IA. By virtue of this, the motors FM, ZM, and IM connected respectively to the amplifiers FA, ZA, and IA are driven at revolving speeds corresponding to the values (the voltages) of the driving signals.

The motors FM, ZM, and IM are linked respectively to the focus lens group FL, the zoom lens group ZL, and the diaphragm I of the image-taking lens. The motors FM, ZM, and IM are drive sections for respectively driving the focus lens group FL, the zoom lens group ZL, and the diaphragm I by means of driving of the motor.

The focus lens group FL, the zoom lens group ZL, and the diaphragm I are linked respectively to the potentiometers FP, ZP, and IP serving as position sensors for detecting the positions thereof. Here, it is sufficient that the potentiometers FP, ZP, and IP are provided respectively in the output shafts or the like of the motors FM, ZM, and IM in a manner of being coupled with the focus lens group FL, the zoom lens group ZL, and the diaphragm I.

The potentiometers FP and ZP are each installed as a lens position acquisition section. From the potentiometer FP, a voltage signal is outputted that has a value corresponding to the position of the focus lens group FL (a value indicating the absolute position). From the potentiometer ZP, a voltage signal is outputted that has a value corresponding to the position of the zoom lens group ZL (a value indicating the absolute position). Then, these signals are provided through the A/D converter 24 to the CPU 20. The potentiometer IP outputs a voltage signal having a value corresponding to the diaphragm position of the diaphragm I (a value indicating the absolute position). Then, the outputted voltage signal is provided through the A/D converter 24 to the CPU 20.

With reference to the lens positions of the focus lens group FL and the zoom lens group ZL detected by the potentiometers FP and ZP, the CPU 20 changes the values of driving signals respectively outputted to the amplifiers FA and ZA so as to control the positions or the operation speeds of the focus lens group FL and the zoom lens group ZL into desired states.

The lens operation section 50 is a controller provided with manual operation members used for specifying by manual operation the target positions and the target movement speeds of focusing (the focus lens group FL) and zooming (the zoom lens group ZL) of the image-taking lens. The lens operation section 50 includes a focus demand and a zoom demand (both not shown) and is connected through the A/D converter 24 to the CPU 20. Each of the focus demand and the zoom demand is provided with a manual operation member.

When the manual operation member of focus demand of the lens operation section 50 is operated, a focus instruction signal that specifies a target position of the focus corresponding to the position of the operation member is provided to the CPU 20. Then, the CPU 20 controls the motor FM by using the driving signal outputted to the amplifier FA so as to perform position control of the focus lens group FL such that the position of the focus lens group FL detected by the potentiometer FP agrees with the target position specified by the focus instruction signal. Here, in general, in manual focusing, position control of the focus lens group FL is performed in accordance with the target position provided from the focus demand. Instead, a target movement speed may be provided from the focus demand and then in accordance with this, the speed control of the focus lens group FL may be performed.

When the manual operation member of zoom demand of the lens operation section 50 is operated, a zoom instruction signal that specifies a target movement speed of the zoom corresponding to the position of the operation member is provided to the CPU 20. Then, the CPU 20 controls the motor ZM by using the driving signal outputted to the amplifier ZA so as to perform movement speed control of the zoom lens group ZL such that the movement speed of the zoom lens group ZL agrees with the target movement speed specified by the zoom instruction signal. Here, in speed control, the information concerning the position of the zoom lens group ZL obtained from the potentiometer ZP is used for speed reduction control or the like near an end. Further, in zoom control, speed control of the zoom lens group ZL is performed in accordance with the target movement speed provided from the zoom demand. Instead, the target position may be provided from the zoom demand and then in accordance with this, position control of the zoom lens group ZL may be performed.

Further, the CPU 20 performs communication control with external devices. The CPU 20 can perform serial communication with the camera CPU 44 of the camera body 40 through serial communication interfaces (SCIs) 26 and 46, or alternatively can perform parallel communication with the camera body 40. For example, the CPU 20 of the lens device 10 transmits lens information such as the zoom position and the focus position detected by the potentiometers FP and ZP, to the camera CPU 44 of the camera body 40. The camera CPU 44 provides, for example, a diaphragm instruction signal specifying the target position of the diaphragm as the CPU 20. The CPU 20 controls the motor IM by using the driving signal outputted to the amplifier IA so as to control the diaphragm position of the diaphragm I such that the diaphragm position (the degree of opening and closing) of the diaphragm I detected by the potentiometer IP agrees with the target position specified by the diaphragm instruction signal provided from the camera CPU 44.

The CCU 60 is connected to the camera body 40. The CCU 60 has a function of receiving an image signal acquired by a CCD 42 of the camera body 40 and then applying various functions onto the image signal so as to adjust the image quality.

The monitor 80 receives an image signal from the camera body 40 through the CCU 60 and then displays onto the screen of the monitor an image generated on the basis of the image signal.

The cut-out operation section 70 includes a manual operation section such as a joy stick. Then, when the manual operation section is operated, setting or change is performed on the position of a cut-out screen obtained by cutting out a part of region of the image displayed on the screen of the monitor 80.

In the camera system 1, the EEPROM 28 stores in advance a data table in which correspondence is established between position information of both of the movable lens group and the correction lens group and the optical performance. Then, the CPU 20 of the lens device 10 reads the data table from the EEPROM 28 and then, on the basis of the data table, controls the correction lens group such as to improve the optical performance of the cut-out image.

When the correction lens group is to be controlled, the CPU 20 outputs driving signals through the D/A converter 22 respectively to the amplifiers HA, VA, and 14A. By virtue of this, the motors HM, VM, and 14M connected respectively to the amplifiers HA, VA, and 14A are driven at revolving speeds corresponding to the values (the voltages) of the driving signals.

The motors HM and VM are linked to the decentering correction lens group 12. The motor HM drives the decentering correction lens group 12 in the X-direction in a plane perpendicular to the optical axis. Further, the motor VM drives the decentering correction lens group 12 in the Y-direction in a plane perpendicular to the optical axis. The motor 14M is linked to the tilt correction lens group 14 and drives the tilt correction lens group 14 in parallel to the optical axis (in the Z-direction).

The potentiometers HP, VP, and 14P are each installed as a position acquisition section of the correction lens group. From the potentiometer HP, a voltage signal is outputted that has a value (a value indicating the absolute position) corresponding to the position in the X-direction of the decentering correction lens group 12. From the potentiometer VP, a voltage signal is outputted that has a value (a value indicating the absolute position) corresponding to the position in the Y-direction of the decentering correction lens group 12. From the potentiometer 14P, a voltage signal is outputted that has a value (a value indicating the absolute position) corresponding to the position in the optical axis direction (the Z-direction) of the tilt correction lens group 14. The voltage signals outputted respectively from the potentiometers HP, VP, and 14P are provided through the A/D converter 24 to the CPU 20.

With reference to the lens positions of the decentering correction lens group 12 and the tilt correction lens group 14 and the lens position of the movable lens group detected by the potentiometers HP, VP, and 14P as well as to the data table, the CPU 20 changes the values of the driving signals outputted respectively to the amplifiers HA, VA, and 14A so as to control the positions of the decentering correction lens group 12 and the tilt correction lens group 14.

Next, the data structure of the data table is described below.

FIGS. 3A and 3B are diagrams showing the data structures of the data tables. In the table shown in FIG. 3A, correspondence is established between the positions of the movable lens group and the diaphragm, the position of the decentering correction lens group 12, and the resolution of each portion of the image at that time. In the table shown in FIG. 3B, correspondence is established between the positions of the movable lens group and the diaphragm, the position of the tilt correction lens group 14, and the resolution of each portion of the image at that time.

The parameter ("a01", "a02", "a03", . . . ) indicating the position information of the focus lens group FL has a value indicating the absolute position of the focus lens group FL. The parameter ("b01", "b02", "b03", . . . ) indicating the position information of the zoom lens group ZL has a value indicating the absolute position of the zoom lens group ZL.

The parameter ("c01", "c02", "c03", . . . ) indicating the diaphragm position of the diaphragm has a value indicating the diaphragm position of the diaphragm I. Each parameter described above has a numerical value such as "0", "−1", and "+1".

The parameter ("d01", "d02", "d03", . . . ) indicating the position information of the decentering correction lens group 12 has a value indicating the position of the decentering correction lens group 12 in a plane perpendicular to the optical axis. These values are coordinates indicating the X-directional position and the Y-directional position of the decentering correction lens group 12.

The parameter ("e01", "e02", "e03", . . . ) indicating the position information of the tilt correction lens group 14 has a value indicating the position in the optical axis direction of the tilt correction lens group 14. Each value is a numerical value such as "−1" and "+1" indicating the position of the Z-direction relative to the reference position of the optical axis direction which is premised to be "0".

The resolution is a value indicating the resolution of each portion of the image acquired with adopting the parameters of the corresponding movable lens group and the correction lens group. A higher value of resolution indicates higher optical performance and a lower value of resolution indicates lower optical performance.

In the data table described above, the resolution has been employed as an index indicating optical performance. However, employable configurations are not limited to this and an MTF (Modulation Transfer Function) may be employed.

Further, the data table described above has a data structure that a table in which correspondence is established between the positions of the movable lens group and the diaphragm and the position of the decentering correction lens group 12 and a table in which correspondence is established between the positions of the movable lens group and the diaphragm and the position of the tilt correction lens group 14 are provided separately. However, employable data structures for the data table are not limited to this. That is, a data structure may be employed that a single table in which correspondence is established between the positions of the movable lens group and the diaphragm and the individual positions of the decentering correction lens group 12 and the tilt correction lens group 14 is provided.

Next, an advantage of adjusting the image quality of a cut-out image cut out from the entire image is described below.

Figure 4:
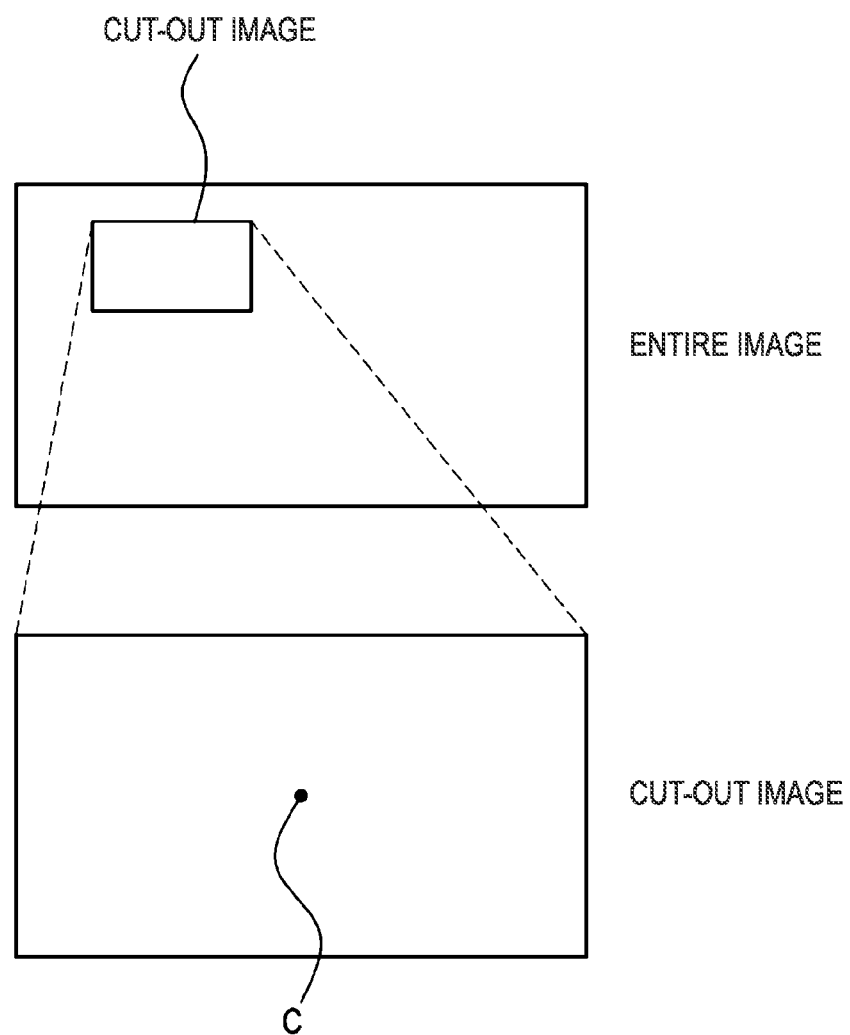
FIG. 4 is a diagram showing an entire image and a cut-out image.

FIG. 4 is a diagram showing an entire image and a cut-out image.

In trimming or electronic zoom, when an image generated on the basis of image information acquired by the CCD 42 of the camera body 40 is adopted as an entire image, the processing of cutting out an image of a part of region of the entire image and then displaying this cut-out image onto a part of entire image, or alternatively the processing of enlarging this cut-out image and then displayed the enlarged image onto the entire screen of the monitor 80 is performed. At that time, in a case that the image quality of the entire image is satisfactory but the image quality of the cut-out image is not sufficiently satisfactory, when such processing is executed, visibility to the user is degraded. In general, in an optical system including an imaging lens, the optical performance is high of the center of the entire image whereas the optical performance of the periphery goes lower than that of the center. Thus, when the image is cut out in a peripheral part of the entire image, the image quality of the cut-out image becomes lower than the image quality of the entire image. In the image processing like trimming and electronic zoom described above, it is more important to improve the image quality of the cut-out image than to improve the image quality of the entire image.

Thus, at the time of image taking, the camera system 1 drives and controls the decentering correction lens group 12 and thereby performs control such as to improve the optical performance of the center C of the cut-out image. Further, the camera system 1 drives and controls the tilt correction lens group 14 and thereby performs control such as to improve the optical performance of the entire cut-out image.

Here, the directions in which the decentering correction lens group 12 and the tilt correction lens group 14 are to be moved are determined uniquely in accordance with the configuration of the lenses including the movable lens group such as the focus lens group FL and the zoom lens group ZL. When the data table is to be generated, it is sufficient that in accordance with the configuration of the actually mounted lenses of the optical system, the driving directions and the amounts of driving of the decentering correction lens group 12 and the tilt correction lens group 14 are acquired by actual measurement and then data is generated in which correspondence is established between the acquired values and the positions of the movable lens group and the diaphragm and the optical performance (the resolution, in this example) of each portion of the image at that time.

Next, a procedure of adjusting the image quality of the cut-out image is described below.

Figure 5:
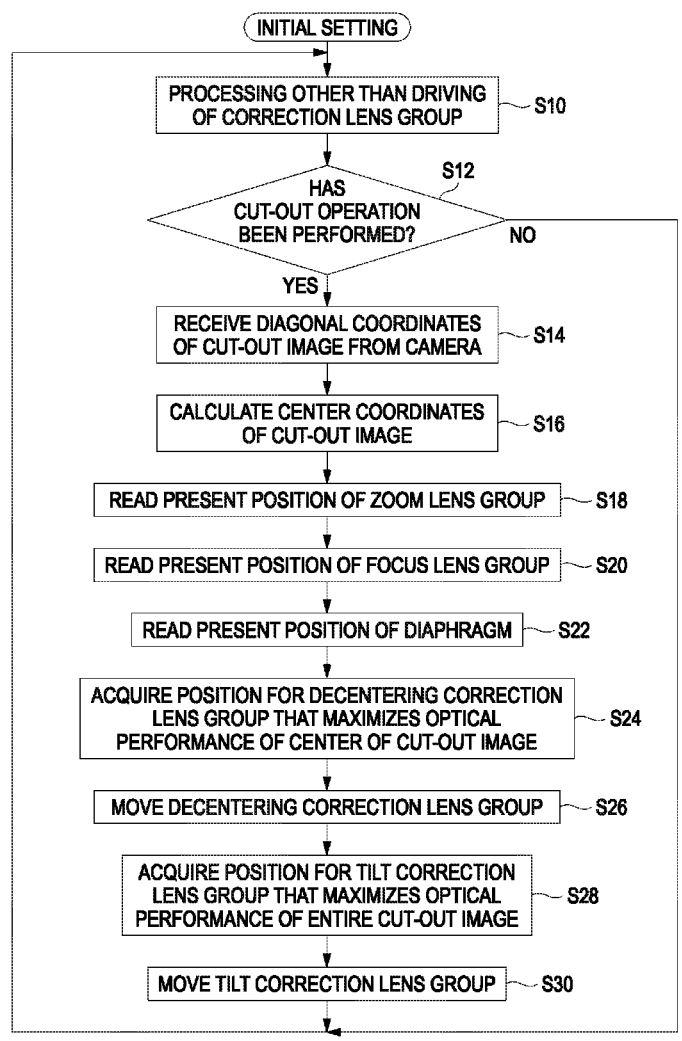
FIG. 5 is a flow chart showing a procedure of adjusting image quality by using a correction lens group in a camera system of FIG. 1.

FIG. 5 is a flow chart showing the procedure of adjusting the image quality of a cut-out image by using the correction lens group in the camera system of FIG. 1. In the following description, the configuration of the camera system 1 of FIG. 1 is referred to, when necessary.

First, the movable lens group, the diaphragm, and the correction lens group are set into a predetermined initial position.

Focusing operation and zooming operation are performed (step S10). Here, operation other than driving of the correction lens group is executed appropriately.

Then, it is detected whether the operation of executing cut-out of an image from the entire image acquired by the camera body 40 has been performed (step S12). The presence or absence of the cut-out operation is judged on the basis of the input signal from the cut-out operation section 70 by the camera CPU 44 of the camera body 40. When cut-out operation is detected, as shown in a step described later, a flow of adjusting the image quality of the cut-out image by controlling the correction lens group is executed. When cut-out operation is not detected, the flow of adjusting the image quality of the cut-out image by controlling the correction lens group is not executed and hence the state of the lens device 10 at step S10 is maintained.

In the flow of adjusting the image quality of the cut-out image, in the lens device 10, the CPU 20 reads from the camera body 40 the diagonal coordinates of the cut-out image (step S14). Then, on the basis of the diagonal coordinates, the CPU 20 calculates the center coordinates of the cut-out image (step S16). As such, the CPU 20 can identify the position of the cut-out image in the entire image.

Then, the CPU 20 reads the output value of the potentiometer ZP so as to detect the present position of the zoom lens group ZL (step S18), then reads the output value of the potentiometer FP so as to detect the present position of the focus lens group FL (step S20), and then reads the output value of the potentiometer IP so as to detect the present diaphragm position of the diaphragm I (step S22). The order of executing the steps S18, S20, and S22 is not limited to this and may be changed appropriately. Alternatively, these steps may be executed simultaneously.

After that, the CPU 20 refers to the data table stored in advance in the storage section 28 and thereby, on the basis of the positions of the focus lens group FL, the zoom lens group ZL, and the diaphragm I, acquires a position for the decentering correction lens group 12 that maximizes the optical performance (the resolution, in this example) of the center of the cut-out image (step S24). Then, in accordance with the acquired position for the decentering correction lens group 12, the CPU 20 drives and controls the decentering correction lens group 12 (step S26).

Further, the CPU 20 refers to the data table stored in advance in the storage section 28 and thereby, on the basis of the positions of the focus lens group FL, the zoom lens group ZL, and the diaphragm I, acquires a position for the tilt correction lens group 14 that maximizes the optical performance (the resolution, in this example) of the entire cut-out image (step S28). Then, in accordance with the acquired position for the tilt correction lens group 14, the CPU 20 drives and controls the tilt correction lens group 14 (step S30).

As such, the camera system 1 drives and controls the decentering correction lens group 12 and the tilt correction lens group 14 of the lens device 10 and can thereby improve the image quality of the cut-out image.

Next, with reference to FIG. 6, another exemplary configuration of a camera system is described below. In this camera system, when a face frame is set up on a photographic object person image by means of face recognition in the entire image, the above-mentioned correction lens group is driven and controlled so that the image quality of the image within the face frame can be adjusted.

Figure 6:
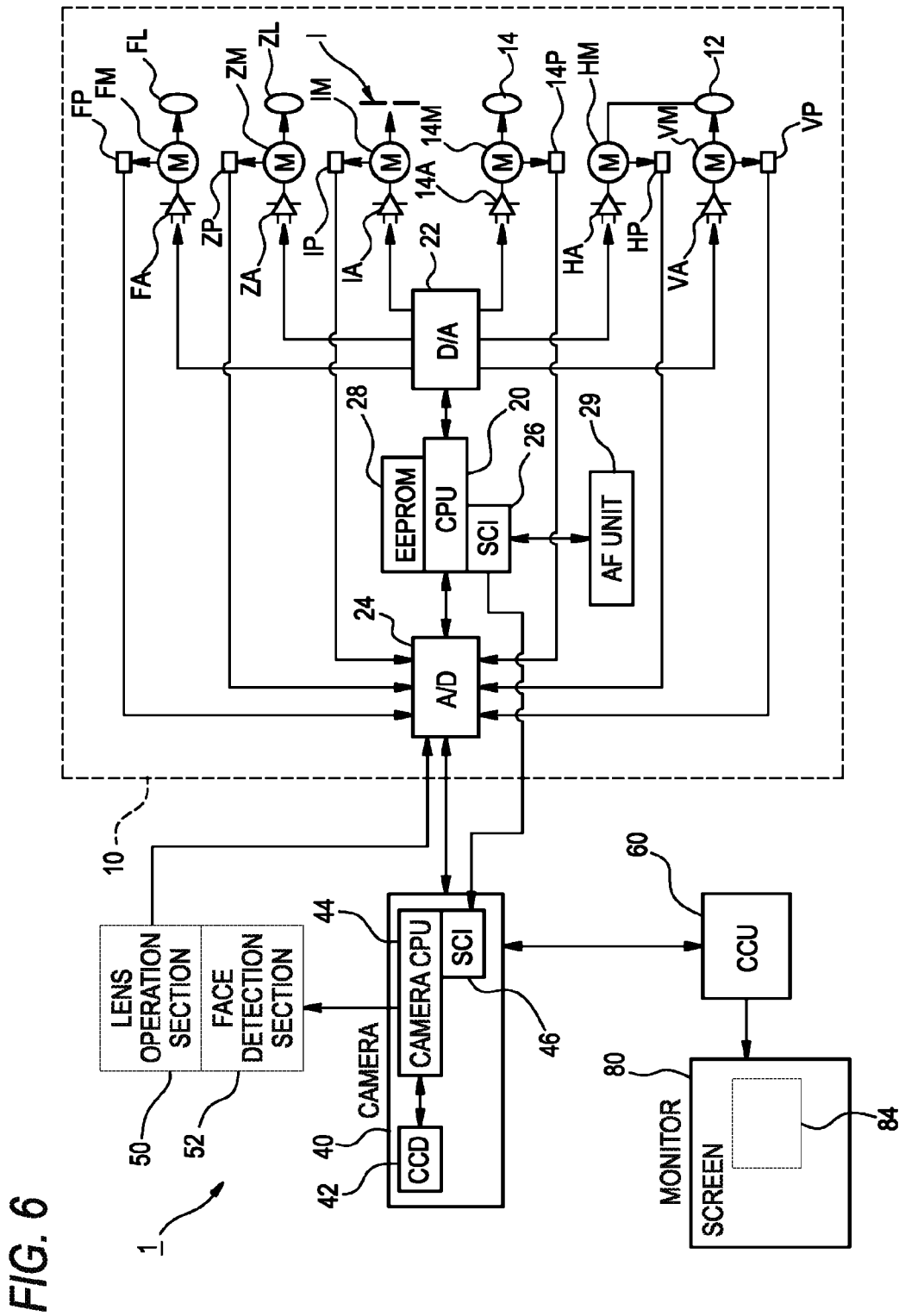
FIG. 6 is a block diagram showing another exemplary configuration of a camera system.

The camera system 1 of FIG. 6 is basically the same as that shown in FIG. 1. The flowing description is given for differences from the configuration of FIG. 1.

An AF unit 29 is provided in the lens device 10. Then, the AF unit 29 is connected to the CPU 20 through an SCI 26.

Further, the camera system 1 includes a face detection section 52. The face detection section 52 is controlled by the camera CPU 44. Here, the camera system 1 does not include a cut-out operation section.

Although not shown, the AF unit 29 is constructed from an AF processing section, an image pick-up circuit for AF, and the like. The image pick-up circuit for AF is arranged in the lens device 10 in order to acquire a video signal for AF processing. Further, the image pick-up circuit for AF includes: an image capturing element (referred to as an image capturing element for AF) such as a CCD; and a processing circuit for outputting the output signal of the image capturing element for AF, as a video signal of predetermined form. Here, the video signal outputted from the image pick-up circuit for AF is a luminance signal.

In the imaging surface of the image capturing element for AF, an image is formed with photographic object light obtained by being divided, by a half mirror arranged on the optical path of the optical system, from the photographic object light entering the image capturing element of the camera body 40. The photographing area and the photographic object distance (the distance of the photographic object where an in-focus state is achieved) of the image pick-up area of the image capturing element for AF are construct such as to agree with the photographing area and the photographic object distance of the image pick-up area of the image capturing element of the camera body 40. Thus, the photographic object image acquired by the image capturing element for AF agrees with the photographic object image acquired by the image capturing element of the camera body 40. Here, both photographing areas need not completely agree with each other. For example, the photographing area of the image capturing element for AF may be a larger area containing the photographing area of the image capturing element of the camera body 40.

The AF processing section acquires the video signal from the image pick-up circuit for AF and then, on the basis of the video signal, calculates a focus evaluation value indicating the magnitude of the contrast of the photographic object image. For example, a signal of high frequency band component in the video signal obtained from the image capturing element for AF is extracted by a high-pass filter. After that, a signal within an extent corresponding to the AF area adopted as a target of AF among the signal of high frequency band component is integrated screen by screen (frame by frame). The integrated value obtained for each screen as described here indicates the magnitude of the contrast of the photographic object image and is provided as the focus evaluation value to the CPU.

The CPU 20 acquires information concerning AF frame (AF frame information) indicating the extent (the contour) of the AF area, through the camera CPU 44. Then, the CPU 20 specifies the extent within the AF frame specified by the AF frame information, as the AF area to the AF processing section. Then, the focus evaluation value acquired from the image (the video signal) within the AF area is acquired from the AF processing section.

As such, at each time that a video signal for one screen is acquired from the image pick-up circuit for AF (at each time that the focus evaluation value is acquired in the AF processing section), the focus evaluation value is acquired from the AF processing section and, at the same time, the focus lens group FL is controlled such that the acquired focus evaluation value becomes the maximum (the local maximum), that is, the contrast of the photographic object image of the AF area is maximized. For example, a mountain climbing method is generally known as a control system for the focus lens group FL based on the focus evaluation value. In this method, the focus lens group FL is moved in a direction that the focus evaluation value increases. Then, when a point where the focus evaluation value begins to decrease is detected, the focus lens group FL is set at this position. By virtue of this, automatic focusing on the photographic object within the AF frame is achieved.

The face detection section 52 performs face authentication on the photographic object person in the acquired photographic object image. Then, when the photographic object person is concluded to be a photographic object (a target of focusing) having been set up in advance such as to be tracked by using auto-focusing or the like, auto-focus control is performed on the lens device 10 through the AF unit 29.

Further, as a result of the face authentication performed by the face detection section 52, when a particular person is recognized, the camera CPU 44 displays a face frame 84 such as to correspond to the photographic object person in the photographic object image, onto the monitor 80 through the CCU 60.

In the camera system 1, the EEPROM 28 stores in advance a data table in which correspondence is established between position information of both of the movable lens group and the correction lens group and the optical performance of each portion. Then, the CPU 20 of the lens device 10 reads the data table from the EEPROM 28 and then, on the basis of the data table, controls the correction lens group such as to improve the optical performance of the image within the face frame 84.

Here, the data structure of the data table is the same as that described above.

Next, an advantage of adjusting the image quality of the image within the face frame 84 in the entire image is described below.

Figure 7:
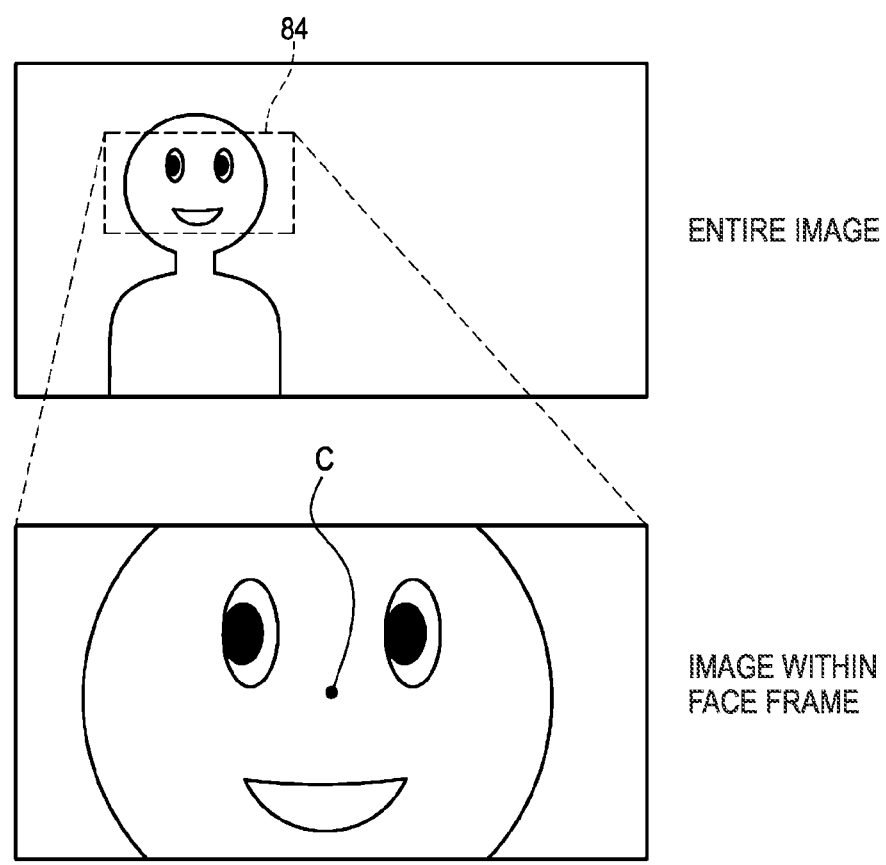
FIG. 7 is a diagram showing an entire image and an image within a face frame.

FIG. 7 is a diagram showing an entire image and an image within a face frame.

The image within the face frame 84 is a target of image taking set forth by the person who takes the image. Thus, in many cases, the processing of enlarging the image within the face frame 84 and then displaying the obtained image onto the monitor 80 is performed. At that time, in a case that the image quality of the entire image is satisfactory but the image quality of the image within the face frame 84 is not sufficiently satisfactory, when such processing is executed, visibility to the user is degraded. In general, in an optical system including an imaging lens, the optical performance is high of the center of the entire image whereas the optical performance of the periphery goes lower than that of the center. Thus, when the face frame 84 is set up in a peripheral part of the entire image, the image quality of the image within the face frame 84 becomes lower than the image quality of the entire image. In face recognition, in some cases, it would be more important to improve the image quality of the image within the face frame 84 than to improve the image quality of the entire image.

Thus, at the time of image taking, the camera system 1 drives and controls the decentering correction lens group 12 and thereby performs control such as to improve the optical performance of the center C of the image within the face frame 84. Further, the camera system 1 drives and controls the tilt correction lens group 14 and thereby performs control such as to improve the optical performance of the entire image within the face frame 84.

Next, a procedure of adjusting the image quality of the image within the face frame is described below.

Figure 8:
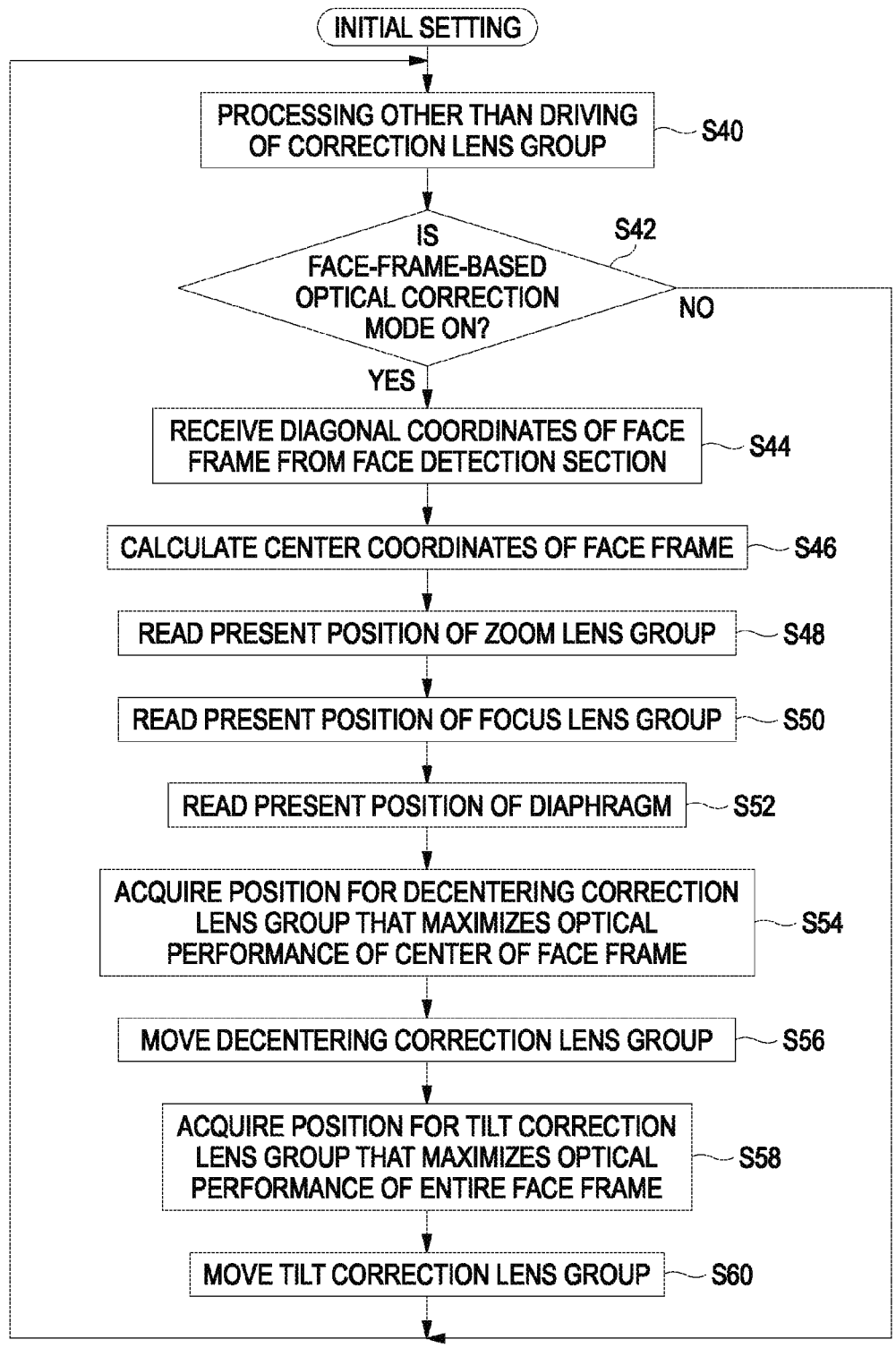
FIG. 8 is a flow chart showing a procedure of adjusting image quality by using a correction lens group in a camera system of FIG. 6.

FIG. 8 is a flow chart showing the procedure of adjusting the image quality of the image within the face frame by using the correction lens group in the camera system of FIG. 6. In the following description, the configuration of the camera system 1 of FIG. 6 is referred to, when necessary.

First, the movable lens group, the diaphragm, and the correction lens group are set into a predetermined initial position.

Focusing operation and zooming operation are performed (step S40). Here, operation other than the operation of driving of the correction lens group is executed appropriately.

Then, it is detected whether the mode is a mode that the image within the face frame set up by face recognition is to be corrected (step S42). Setting of the mode that the image within the face frame is to be corrected can be turned ON/OFF selectively, for example, in the lens operation section 50 or in the camera body 40. Further, detection of the mode that the image within the face frame is to be corrected is judged by the camera CPU 44. When the mode that the image within the face frame is to be corrected is ON, as shown in a step described later, a flow of adjusting the image quality of the image within the face frame 84 by controlling the correction lens group is executed. When the mode that the image within the face frame is to be corrected is OFF, the flow of adjusting the image quality of the image within the face frame 84 by controlling the correction lens group is not executed and hence the image-taking state of the lens device 10 at step S40 is maintained.

In the flow of adjusting the image quality of the image within the face frame 84, in the lens device 10, the CPU 20 reads from the camera body 40 the diagonal coordinates of the face frame 84 in the entire image (step S44). Then, on the basis of the diagonal coordinates, the CPU 20 calculates the center coordinates of the image within the face frame 84 (step S46). As such, the CPU 20 can identify the position of the image within the face frame 84 in the entire image.

Then, the CPU 20 reads the output value of the potentiometer ZP so as to detect the present position of the zoom lens group ZL (step S48), then reads the output value of the potentiometer FP so as to detect the present position of the focus lens group FL (step S50), and then reads the output value of the potentiometer IP so as to detect the present diaphragm position of the diaphragm I (step S52). The order of executing the steps S48, S50, and S52 is not limited to this and may be changed appropriately. Alternatively, these steps may be executed simultaneously.

After that, the CPU 20 refers to the data table stored in advance in the EEPROM 28 and thereby, on the basis of the positions of the focus lens group FL, the zoom lens group ZL, and the diaphragm I, acquires a position for the decentering correction lens group 12 that maximizes the optical performance (the resolution, in this example) of the center of the image within the face frame 84 (step S54). Then, in accordance with the acquired position for the decentering correction lens group 12, the CPU 20 drives and controls the decentering correction lens group 12 (step S56).

Further, the CPU 20 refers to the data table stored in advance in the EEPROM 28 and thereby, on the basis of the positions of the focus lens group FL, the zoom lens group ZL, and the diaphragm I, acquires a position for the tilt correction lens group 14 that maximizes the optical performance (the resolution, in this example) of the entire image within the face frame 84 (step S58). Then, in accordance with the acquired position for the tilt correction lens group 14, the CPU 20 drives and controls the tilt correction lens group 14 (step S60).

As such, the camera system 1 drives and controls the decentering correction lens group 12 and the tilt correction lens group 14 of the lens device 10 and can thereby improve the image quality of the image within the face frame 84.

Next, with reference to FIG. 9, another exemplary configuration of a camera system is described below. In the camera system 1, an entire image is divided into a plurality of areas, then an area having the maximum contrast among the plurality of areas is acquired, and then the correction lens group described above is driven and controlled so that the image quality of the image of the area having the maximum contrast can be adjusted.

Figure 9:
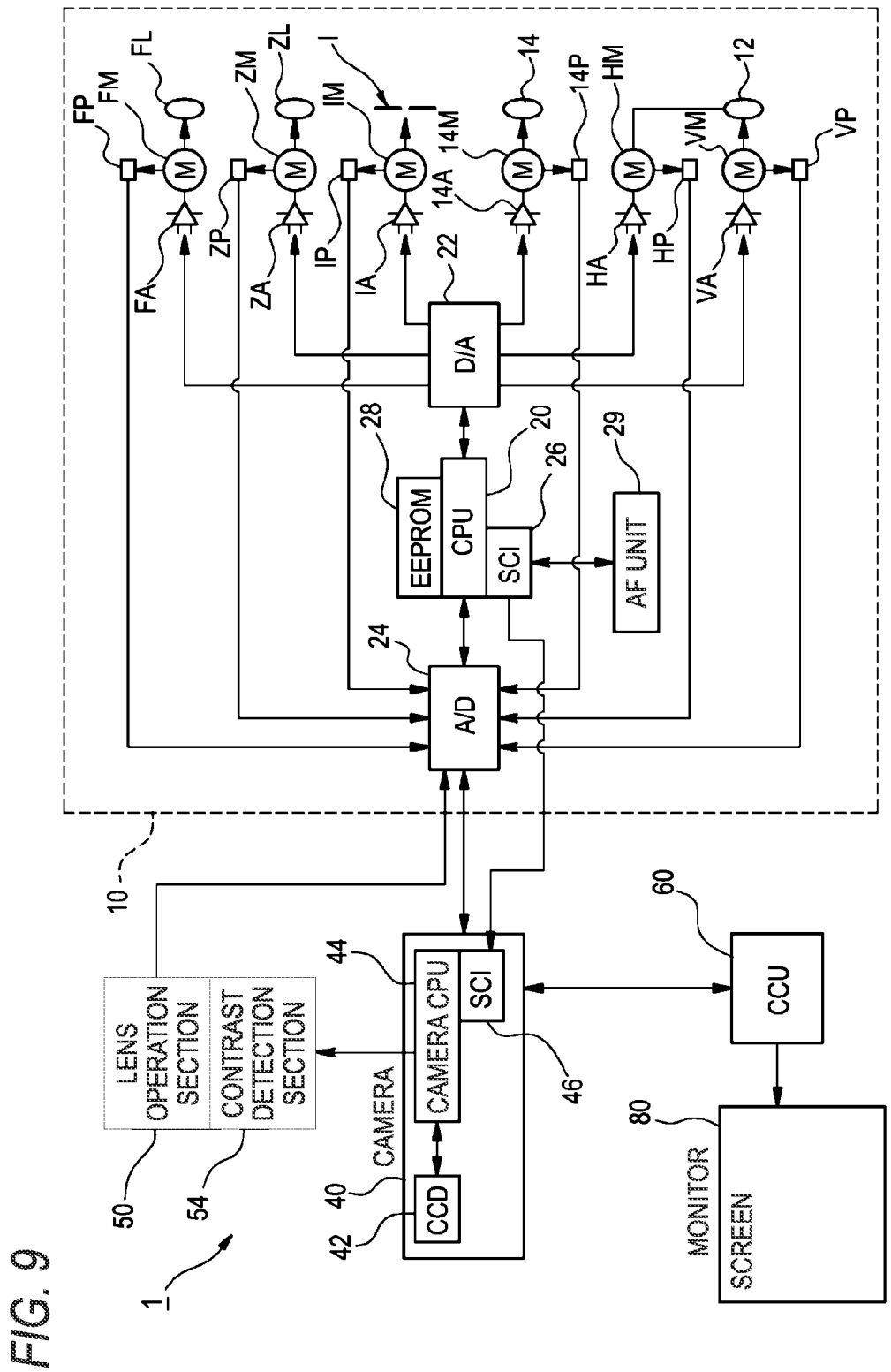
FIG. 9 is a diagram showing another exemplary configuration of a camera system.

The camera system 1 of FIG. 9 is basically the same as that shown in FIG. 1. The flowing description is given for differences from the configuration of FIG. 1.

The camera system 1 includes a contrast detection section 54. The contrast detection section 54 is controlled by the camera CPU 44. Here, the camera system 1 does not include a cut-out operation section.

Further, the camera system 1 includes the AF unit 29. The AF unit 29 is the same as that described above. Thus, its description is omitted.

Figure 10:
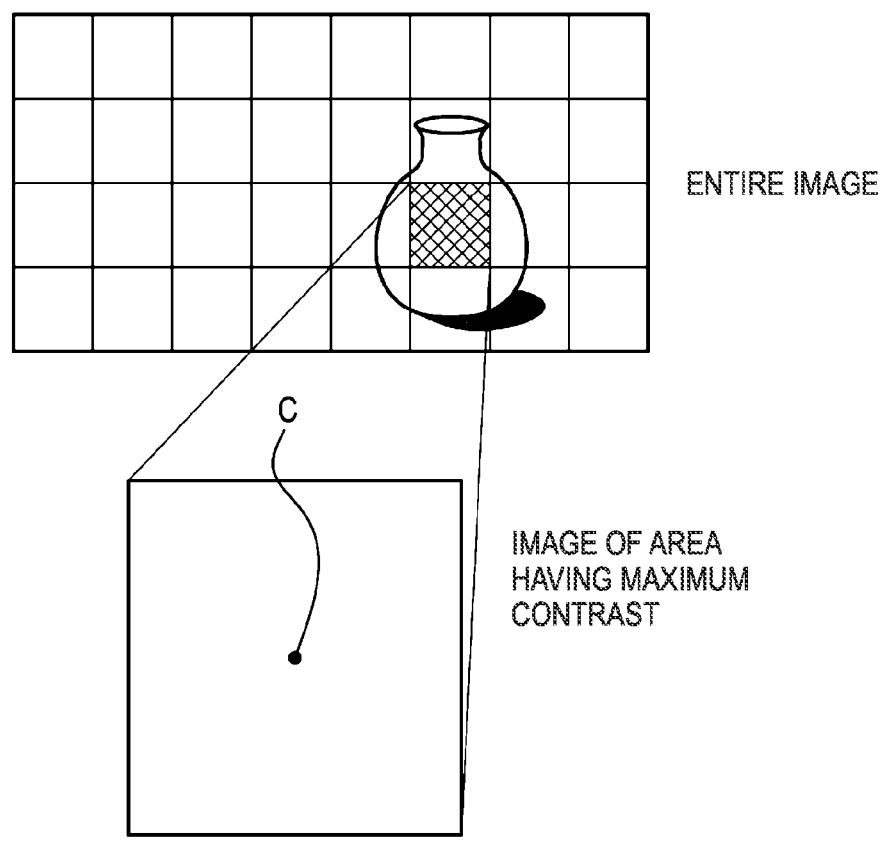
FIG. 10 is a diagram showing an entire image and an image of an area having the maximum contrast among the plurality of areas obtained by dividing the entire image.

FIG. 10 is a diagram showing an entire image and an image of an area having the maximum contrast among the plurality of areas obtained by dividing the entire image.

The contrast detection section 54 includes an image processing section (not shown), then divides into a plurality of areas the image obtained from the camera body 40 by image pick-up, and then calculates the contrast value of each of the plurality of areas. Further, the contrast detection section 54 generates coordinate information for each of the plurality of divided areas and then manages information in which correspondence is established between each area, the coordinate information, and the contrast value.

Next, an advantage of adjusting the image quality of the image of an area having the highest contrast among the plurality of areas obtained by dividing the entire image is described below.

For example, in auto-focusing, within the entire image, the focus is set up on the photographic object image desired to be acquired by the person who takes the image. Thus, it is desired that the optical performance is maximized in the photographic object image. Then, there is a tendency that when the focus is set up on the photographic object image, the contrast of the region containing the photographic object image in the entire image becomes high. Thus, at the time of image taking, the camera system 1 drives and controls the decentering correction lens group 12 and thereby performs control such as to improve the optical performance of the center C of the image of an area having the maximum contrast. Further, the camera system 1 drives and controls the tilt correction lens group 14 and thereby performs control such as to improve the optical performance of the entire image of the area.

Next, a procedure of adjusting the image quality of the image of an area having the maximum contrast is described below.

Figure 11:
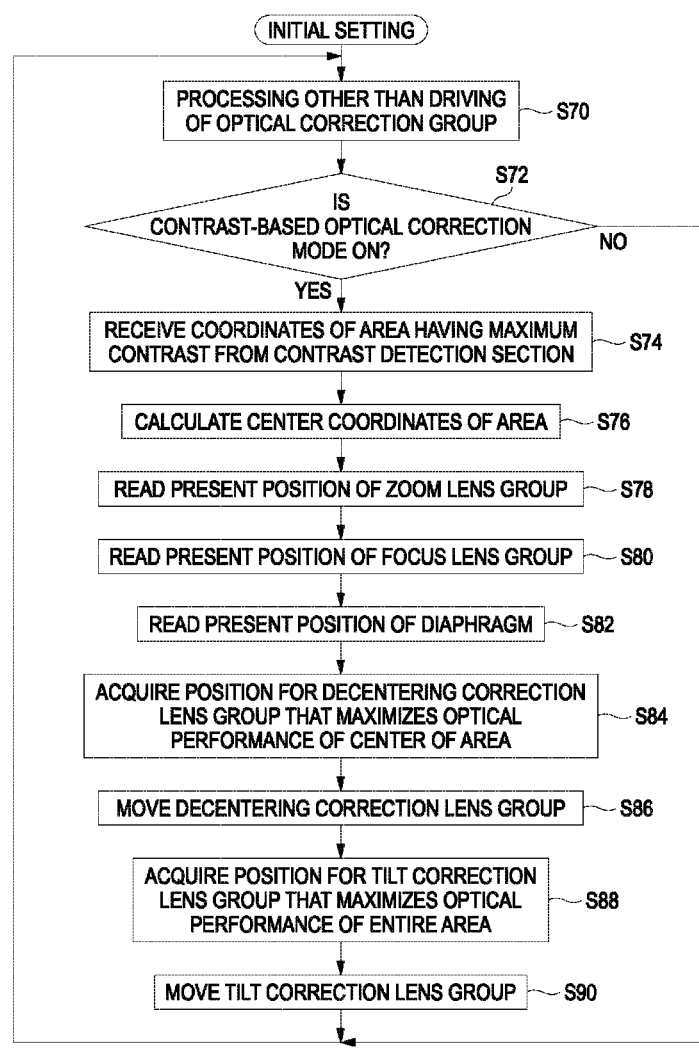
FIG. 11 is a flow chart showing a procedure of adjusting image quality by using a correction lens group in a camera system of FIG. 9.

FIG. 11 is a flow chart showing the procedure of adjusting the image quality of the image of an area having the maximum contrast by using the correction lens group in the camera system of FIG. 9. In the following description, the configuration of the camera system 1 of FIG. 9 is referred to, when necessary.

First, the movable lens group, the diaphragm, and the correction lens group are set into a predetermined initial position.

Focusing operation and zooming operation are performed (step S70). Here, operation other than driving of the correction lens group is executed appropriately.

Then, it is detected whether the mode is set to be a mode that the image is to be divided and then the image quality is to be adjusted on the basis of the contrast (step S72). Setting of this mode can be turned ON/OFF selectively, for example, in the lens operation section 50 or in the camera body 40. Further, detection of this mode is judged by the camera CPU 44. When this mode is ON, as shown in a step described later, a flow of dividing the image and then adjusting the image quality on the basis of the contrast is executed. When the mode is OFF, the flow of dividing the image and then adjusting the image quality on the basis of the contrast is not executed and hence the image-taking state of the lens device 10 at step S70 is maintained.

In the flow of dividing the image and then adjusting the image quality on the basis of the contrast, the camera CPU 44 controls the contrast detection section so that the contrast detection section 54 divides into a plurality the image acquired by the camera body 40 and then calculates the contrast value for each of the plurality of divided areas. Then, the contrast detection section 54 identifies an area having the maximum contrast value among the plurality of areas. The lens device 10 receives the coordinate information of the area having the maximum contrast value, from the contrast detection section 54 through the camera CPU 44 (step S74). Then, on the basis of the coordinate information, the CPU 20 calculates the center coordinates of the area having the maximum contrast value (step S76).

Then, the CPU 20 reads the output value of the potentiometer ZP so as to detect the present position of the zoom lens group ZL (step S78), then reads the output value of the potentiometer FP so as to detect the present position of the focus lens group FL (step S80), and then reads the output value of the potentiometer IP so as to detect the present diaphragm position of the diaphragm I (step S82). The order of executing the steps S78, S80, and S82 is not limited to this and may be changed appropriately. Alternatively, these steps may be executed simultaneously.

After that, the CPU 20 refers to the data table stored in advance in the EEPROM 28 and thereby, on the basis of the positions of the focus lens group FL, the zoom lens group ZL, and the diaphragm I, acquires a position for the decentering correction lens group 12 that maximizes the optical performance (the resolution, in this example) of the center of the image of the area having the maximum contrast value (step S84). Then, in accordance with the acquired position for the decentering correction lens group 12, the CPU 20 drives and controls the decentering correction lens group 12 (step S86).

Further, the CPU 20 refers to the data table stored in advance in the EEPROM 28 and thereby, on the basis of the positions of the focus lens group FL, the zoom lens group ZL, and the diaphragm I, acquires a position for the tilt correction lens group 14 that maximizes the optical performance (the resolution, in this example) of the entire image of the area having the maximum contrast value (step S88). Then, in accordance with the acquired position for the tilt correction lens group 14, the CPU 20 drives and controls the tilt correction lens group 14 (step S90).

As such, the camera system 1 drives and controls the decentering correction lens group 12 and the tilt correction lens group 14 of the lens device 10 so that the image quality of the image of the area having the maximum contrast value can be improved.

In the above-mentioned example that correction is performed such that the optical performance is maximized, the resolution or the MTF has been employed as an example. However, employable configurations are not limited to this. For example, as described below, the correction lens group may be controlled in a state that a characteristic property other than the resolution and the MTF is employed instead.

Example 1 of Characteristic Property Other than Resolution and MTF

The contrast evaluation value of the image is measured and then the correction lens group is driven such that the contrast evaluation value is maximized. In this case, it is sufficient that the data table in advance contains information in which correspondence is established between the position of the movable lens group, the position of the correction lens group, and the contrast evaluation value.

Example 2 of Characteristic Property Other than Resolution and MTF

The area (translator's note: a measure of a surface) of high-luminance portion in a predetermined area within the image is measured and then the lens is driven such that the area is minimized.

Example 3 of Characteristic Property Other than Resolution and MTF

The image is divided into a plurality of regions, then a region having the highest luminance value is detected, and then the lens is driven such that the luminance of the region having the highest luminance value becomes the maximum luminance value on the screen.

Example 4 of Characteristic Property Other than Resolution and MTF

Image analysis is performed on the contour of the photographic object image of the image and then the lens is driven such that the boundary of the contour becomes thinnest.

Example 5 of Characteristic Property Other than Resolution and MTF

Image analysis is performed on the shape of the image and then the lens is driven such that the analysis result of the shape becomes closest to a predetermined image analysis value (depending on the kind of the image). (For example, when it is judged that the image is of a face, the lens is moved such that the value agrees with the analysis value of a face, so that the lens is controlled such that the image looks like a face to the most extent.

Example 6 of Characteristic Property Other than Resolution and MTF

Any other evaluation value is employed and then the lens is controlled such that the value of a parameter of diverse kind (a value capable of being converted into the contrast value or the MTF) indicating the optical performance is maximized.

Example 7 of Characteristic Property Other than Resolution and MTF

Any other evaluation value is employed and then the lens is controlled such that the value of a parameter of diverse kind (a value capable of being converted into the contrast value or the MTF) indicating the optical performance of a portion obtained by subdividing the inside of the area is maximized.

The lens system and the camera system mentioned above have been described for an example that both of the decentering correction lens group and the tilt correction lens group are used. Instead, the optical performance of the image may be adjusted by using any one of these.

Next, with reference to FIG. 12, another exemplary configuration of a camera system is described below. In the camera system 1, an entire image is divided into a plurality of areas, then an area having the maximum contrast among the plurality of areas is acquired, and then the correction lens group described above is driven and controlled so that the image quality of the image of the area having the maximum contrast can be adjusted.

Figure 12:
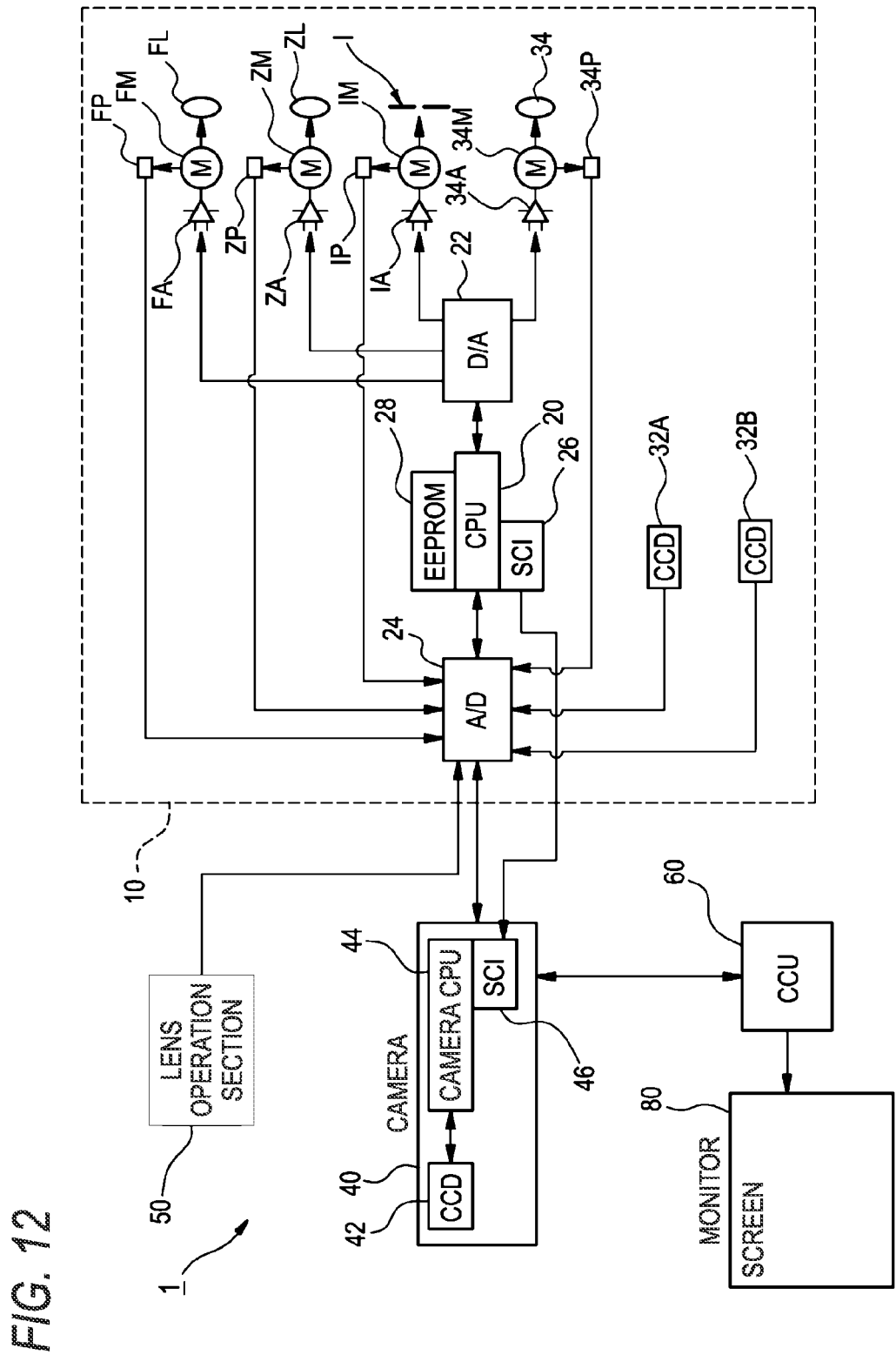
FIG. 12 is a block diagram showing a configuration of a camera system provided with a lens device.
Figure 13:
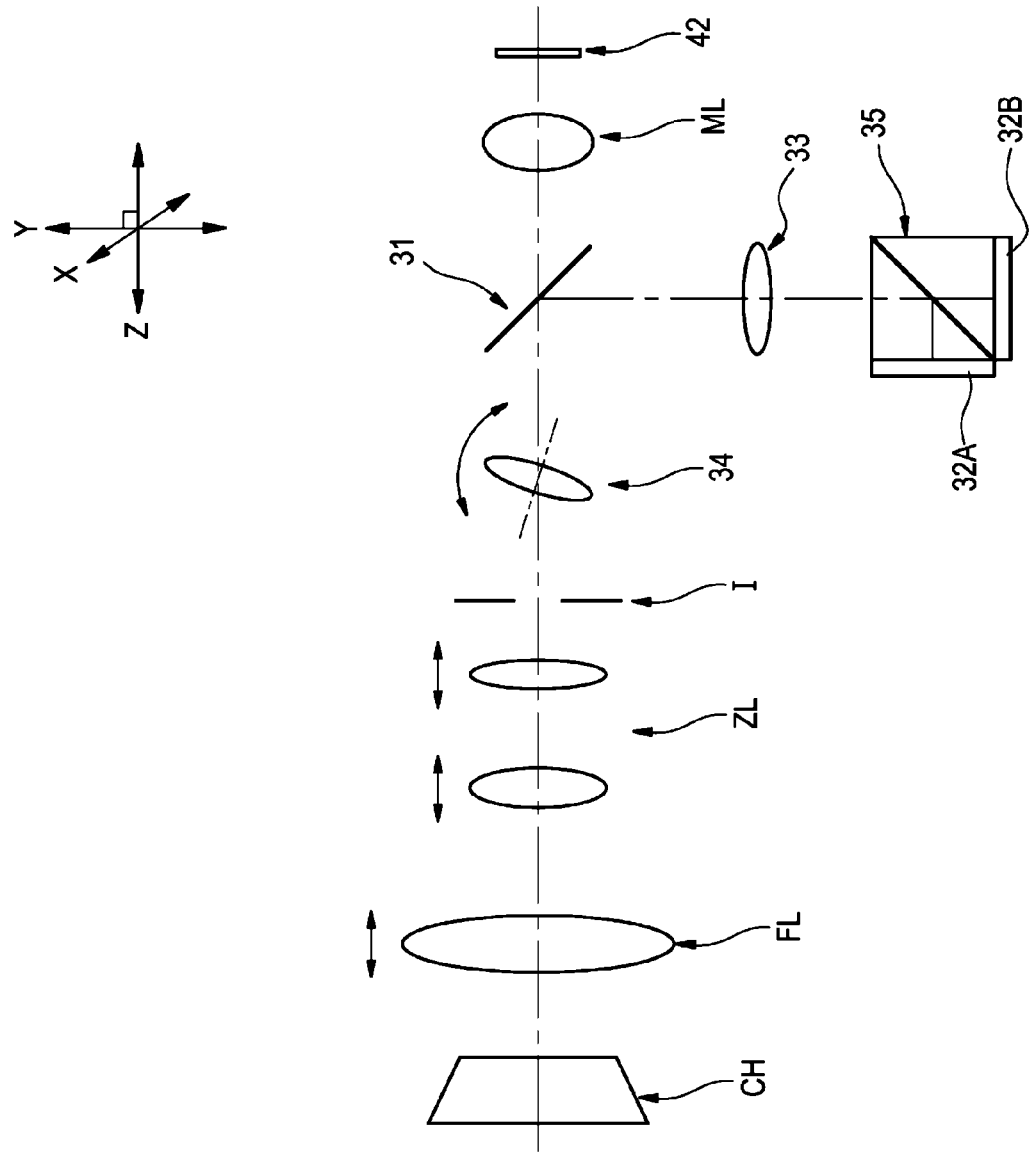
FIG. 13 is a diagram schematically showing an optical system of a camera system of FIG. 12.

FIG. 12 is a block diagram showing a main configuration of a camera system provided with a lens device of the present invention. FIG. 13 is a diagram schematically showing the optical system of the lens device.

The optical system of the lens device 10 is an image-taking optical system for forming an image of a photographic object onto the imaging surface of the image capturing element 42 of the camera body 40. In the optical system, the focus lens group FL, the zoom lens group ZL, the diaphragm I, the tilt correction lens group 34, a beam splitter 31, and the master lens group ML are provided in this order from the photographic object side to the imaging surface.

The beam splitter 31 is a half mirror for dividing the light beam transmitted through the decentering correction lens group into a first optical path leading to the imaging surface and a second optical path reflected in a direction approximately perpendicular to the first optical path.

The second optical path is provided with a condenser lens 33 for condensing the light reflected by the beam splitter 31 and a beam splitter 35 for further dividing the light condensed by the condenser lens 33.

The beam splitter 35 is a half mirror of cube type for dividing into two light beams the light beam entering along the second optical path. Two light exiting surfaces are formed in the beam splitter. Then, CCDs 32A and 32B are provided respectively on the two light exiting surfaces. Further, the CCDs 32A and 32B are arranged in a mutually conjugate positional relationship at image formation positions of the light beam traveling along the second optical path.

The CCDs 32A and 32B are used for detecting an in-focus state. Further, the CCDs 32A and 32B are used also for decentering correction as described later.

The tilt correction lens group 34 rotates about an axis set forth in a direction perpendicular to the optical axis direction so that the tilt angle varies. The tilt correction lens group 34 is a correction lens group driven and controlled as described later so that the tilt angle is changed relative to the optical axis of the optical system so that the position of the center line of the light beam transmitted through the optical system is adjusted and thereby degradation of the image quality caused by decentering present in the individual lenses is suppressed.

The control system of the lens device 10 includes a CPU 20, an EEPROM 28, amplifiers FA, ZA, IA, and 34A, motors FM, ZM, IM, and 34M, and potentiometers FP, ZP, IP, and 34P.

The motor 34M is linked to the decentering correction lens group 12. The motor 34M is linked to the tilt correction lens group 34 and drives the tilt correction lens group 34 such as to tilt relative to a plane (the X-Y plane) perpendicular to the optical axis so that the tilt angle of the tilt correction lens group 34 is changed.

The potentiometer 34P is installed as a position acquisition section of the correction lens group. From the potentiometer 34P, a voltage signal is outputted that has a value corresponding to the tilt angle of the tilt correction lens group 34. The voltage signal outputted from the potentiometer 34P is provided through the A/D converter 24 to the CPU 20.

With reference to the tilt angle of the tilt correction lens group 34 detected by the potentiometer 34P, the lens position of the movable lens group, and the data table, the CPU 20 changes the value of the driving signal outputted to the amplifier 34A so as to control the tilt angle of the tilt correction lens group 34.

The lens device 10 has a function of detecting the in-focus position of the contrast method by using the CCD 32A and the CCD 32B. Next, in-focus position detection in this method is described below.

In the lens device 10, at the image formation positions of the second optical path of the optical system, each of the CCD 32A and the CCD 32B is arranged in a manner of being displaced from the image formation position by the same interval of the back and forth direction in the center line direction of the light beam. By virtue of this, the CCDs 32A and 32B can simultaneously detect an in-focus state. This improves the speed of identifying the in-focus position in comparison with wobbling.

Figure 14:
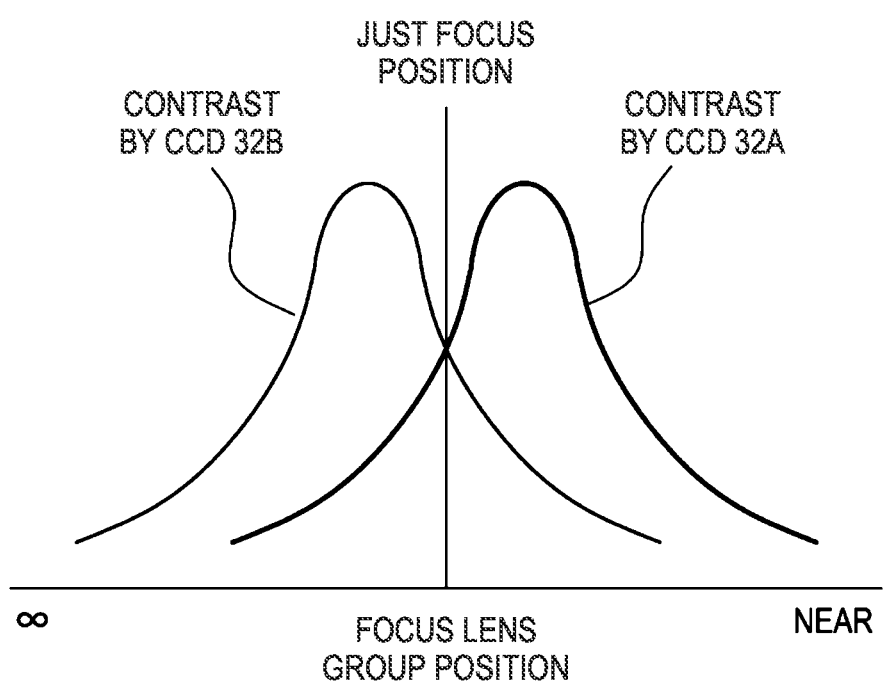
FIG. 14 is a diagram showing a method of focus control in a camera system of FIG. 12.

A diagram is presented that shows a method of focus control in the lens device 10. FIG. 14 shows the relation between the position of the focus lens group FL and the contrast detected from each of the CCDs 32A and 32B.

As shown in FIG. 14, in the in-focus position detection in the lens device 10, the focus lens group FL is controlled into a position where the evaluation value of the CCD 32A and the evaluation value of the CCD 32B agree with each other such that the focus evaluation value (the evaluation value, hereinafter) indicating the contrast in the image formation surface of the CCD 42 on the camera body 40 side is maximized.

When the magnitudes of the evaluation values of the two CCDs 32A and 32B are compared with each other, it can be determined whether the focus lens group FL is to be moved to the FAR limit or to the NEAR limit. Further, the focal speed can be set up in accordance with the difference (or the ratio) of the individual evaluation values. Thus, in contrast to general mountain-climbing method AF, in the AF method of the lens device 10, the operation of overshooting the in-focus point is unnecessary.

The lens device 10 performs decentering correction of the optical system of the lens device 10 by using the CCD 32A and the CCD 32B described above and without using the CCD 42 of the camera body 40.

In the lens device 10, at the time of assembly or maintenance in a manufacturing plant, decentering correction is performed on the lens device 10 in a stand-alone state.

Here, the optical system in the first optical path and the optical system in the second optical path are equivalent to each other. That is, when decentering correction is performed in the second optical path by using the CCD 32A and the CCD 32B, adjustment is achieved that is equivalent to decentering correction performed by using the CCD 42 of the camera body 40 in which image formation is performed with the light beam of the first optical path.

Figure 15:
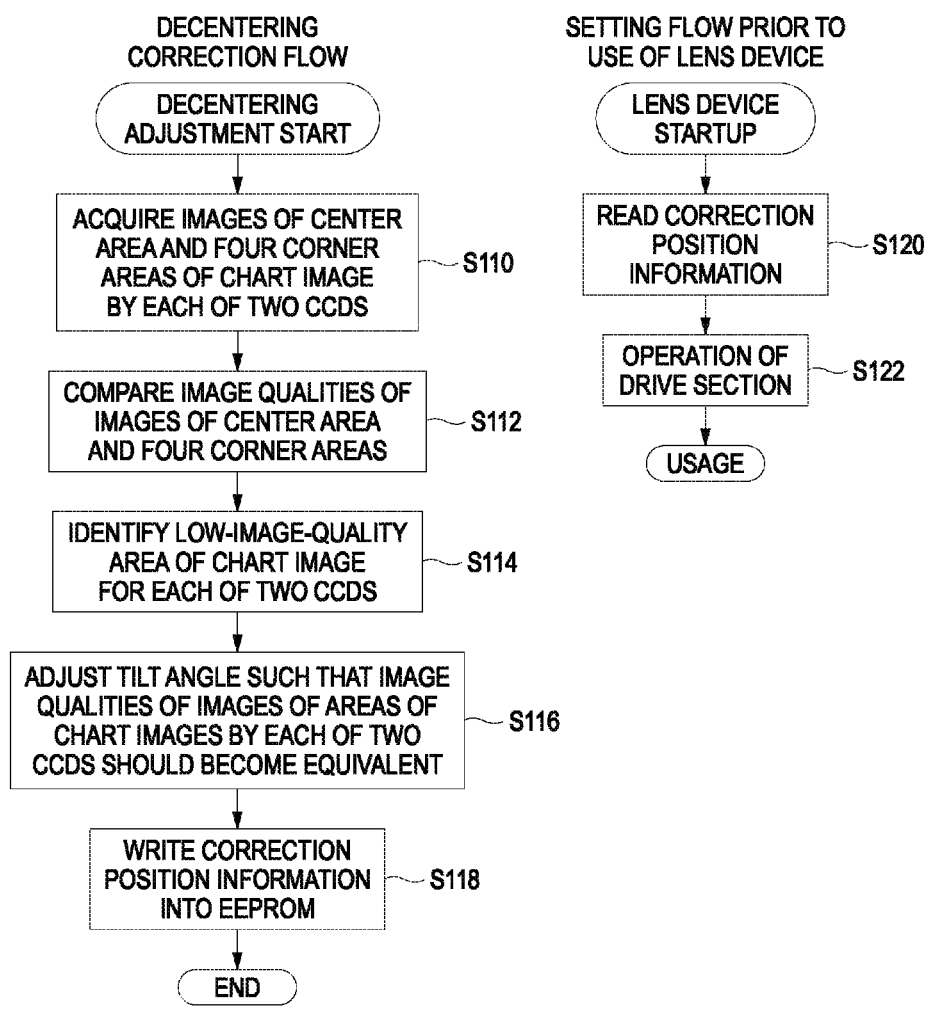
FIG. 15 is a flow chart showing a procedure of performing decentering adjustment in a lens device of FIG. 12.

FIG. 15 is a flow chart showing a procedure of performing decentering correction in a lens device of FIG. 12.

First, in the lens device 10, when decentering correction is to be performed under the control of the CPU 20, image acquisition is performed on an image quality evaluation chart CH by each of the CCDs 32A and 32B as shown in FIG. 13 so that chart images are acquired. At that time, within the chart image acquired by the CCD 32A, a total of five images of the center area and the four corner areas are acquired (step S110). Then, the CPU 20 calculates the contrast values of the image of the center area and the individual images of the four corner areas. In this example, the contrast value is adopted as the evaluation value.

Figure 16:
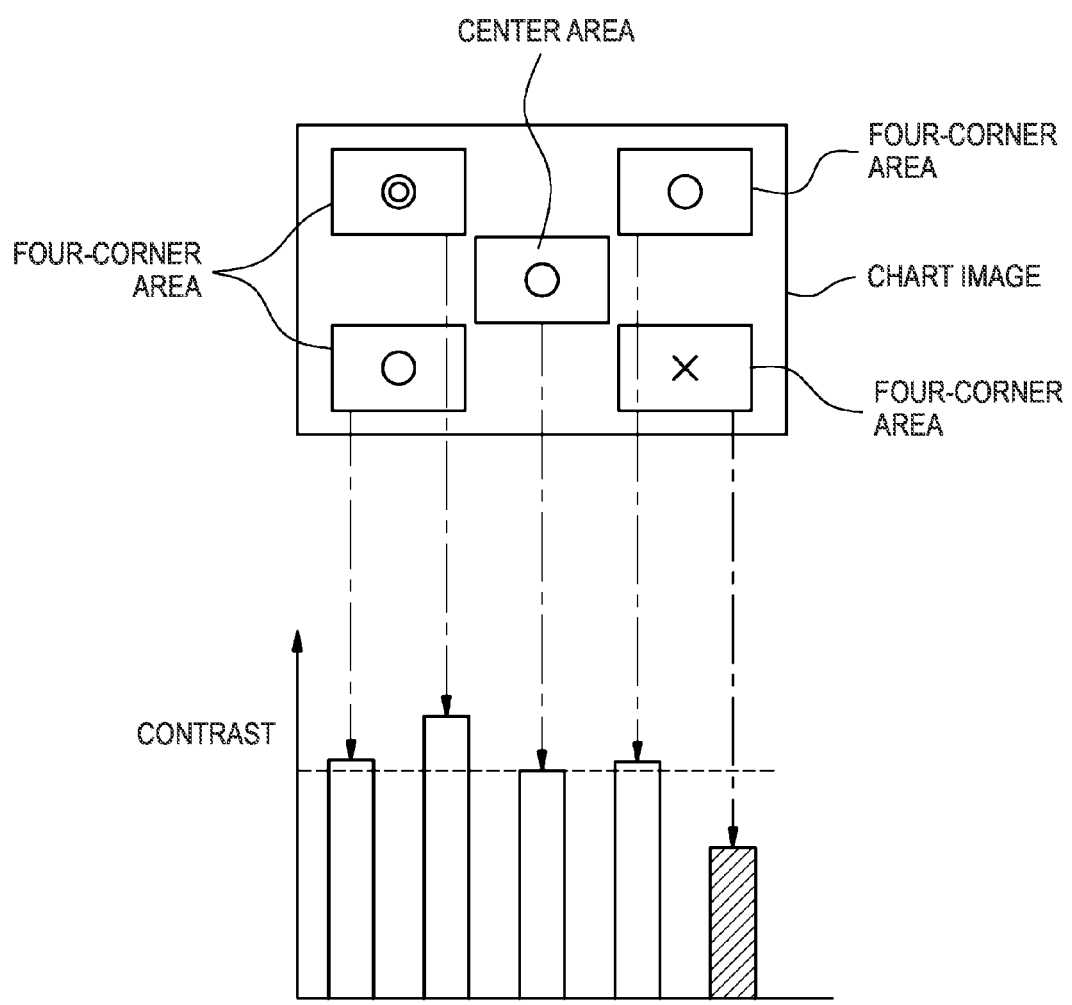
FIG. 16 is a diagram showing an image acquired by a CCD of a lens device and the contrast of each image area.

After that, on the basis of the evaluation value calculated in each area, the CPU 20 compares the contrast value of the image of the center area with the contrast value of each image of the four corner areas (step S112). FIG. 16 is a diagram schematically showing the contrast of each area of the chart image. FIG. 16 schematically shows a chart image acquired by one CCD. However, in this example, the chart image is acquired from each of the CCD 32A and the CCD 32B. Then, in each of the two chart images, comparison of the image of the center area with the image of each of the other areas is performed.

In FIG. 16, the image of the upper left area has the highest contrast. Then, the images of the center area, the upper right area, and the lower left area have the second highest contrast, and the image of the lower right area has the lowest contrast. In FIG. 16, in comparison with the contrast of the image of the center area, the contrast of the image of the upper left area is high and the difference is greater than those of the other areas. Thus, the image quality of the image of the upper left area is judged to be satisfactory, and hence a mark "⊙" is placed. On the other hand, the contrast of the image of the lower right area is lower than the contrast of the image of the center area, the image quality of the image of the lower right area is judged to be poor and hence a mark "x" is placed.

Here, the comparison of the images of the individual areas may be performed on the basis of a threshold set up in advance. When the contrast value is greater than the threshold, a mark "○" may be placed. When the contrast value is smaller than the threshold, a mark "x" may be placed. Further, when the contrast value is greater than the threshold and the difference is greater than or equal to a predetermined value, a mark "⊚" may be placed.

Here, the method of comparing the images of the individual areas is not limited to the method using the threshold as described above. For example, an average contrast value may be calculated over the contrast values in each area. Then, the image quality of the image of each area may be evaluated on the basis of the average value.

The CPU 20 compares the image qualities of the images of the individual areas as described above so as to identify an area where the image quality of each image acquired by the CCD 32A or the CCD 32B is the lowest (S114). Then, the CPU 20 drives the tilt correction lens group 34 such that the evaluation value of the image of the area having the low image quality becomes high, and thereby changes the tilt angle so as to perform adjustment such that the image of each area has almost the same image quality (step S116).

Figure 17:
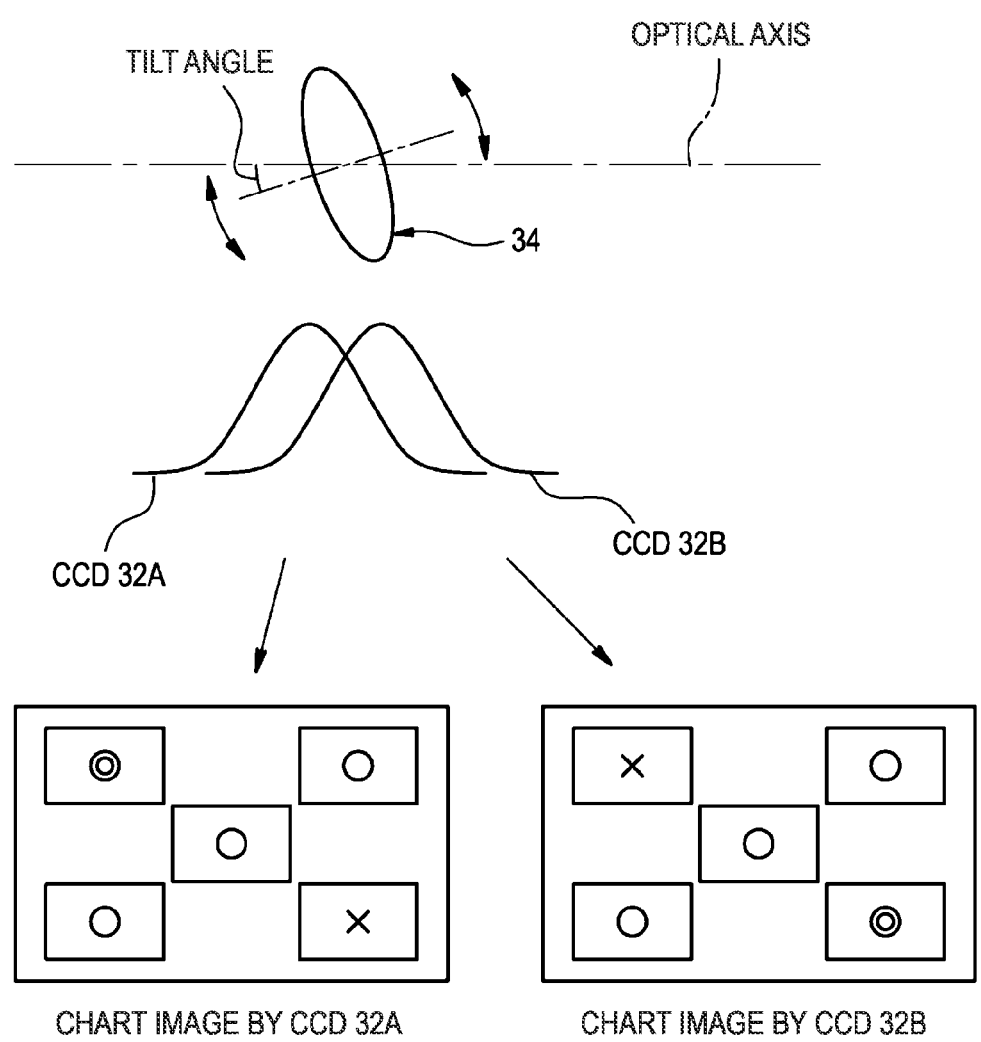
FIG. 17 is a diagram describing a method of setting a tilt angle of a tilt correction lens group on the basis of a chart image in a lens device of FIG. 12.

FIG. 17 is a diagram describing a method of setting the tilt angle of the tilt correction lens group 34 on the basis of the chart image.

The CCD 32A and the CCD 32B are arranged in a mutually conjugate positional relationship at image formation positions of the second optical path. Thus, in the chart images obtained from the CCD 32A and the CCD 32B, the evaluation values of the individual areas have symmetry. As shown in FIG. 17, the evaluation value of the image of the upper left area of the CCD 32A is the highest while, in the CCD 32B, the evaluation value of the image of the lower right area is the highest. Further, the evaluation value of the image of the lower right area of the CCD 32A is the lowest while, in the CCD 32B, the evaluation value of the image of the upper left area is the lowest. As such, the chart images obtained from the CCD 32A and the CCD 32B are in a mutually conjugate relation with respect to the evaluation value of each area. In the lens device 10, on the basis of the symmetry in the chart images obtained from the CCD 32A and the CCD 32B, the tilt angle of the tilt correction lens group 34 is set up under the drive control of the CPU 20.

Here, the direction of changing of the tilt angle of the tilt correction lens group 34 is determined in accordance with the design of the optical system of the lens device 10. In FIG. 17, the tilt correction lens group 34 is schematically expressed as a single lens. However, actually, other lens groups are arranged on the photographic object side and the image surface side of the tilt correction lens group 34. Then, the direction of shift of the image occurring when the tilt correction lens group 34 is tilted varies depending on the lens shapes and the number of lenses of these and other lens groups. Thus, the direction of shift of the image occurring when the tilt angle of the tilt correction lens group 34 is moved in a direction is determined with taking into consideration the design of the optical system of the lens device 10. Accordingly, at the time of decentering correction, it is sufficient that the CPU 20 drives and controls the tilt correction lens group 34 in a predetermined direction in accordance with the design of the optical system.

When the tilt angle of the tilt correction lens group 34 is changed so that the contrast value of the image of each area becomes greater than or equal to the threshold, the CPU 20 judges that the image qualities of the images of the individual areas have become uniform. Alternatively, when the difference between the maximum and the minimum of the contrast of the images of the individual areas falls within a predetermined range, the CPU 20 may judge that the image qualities of the images of the individual areas have become uniform. Alternatively, when the contrast values of the images of the individual areas become greater than or equal to the threshold and the difference between the maximum and the minimum of the contrast of the images of the individual areas falls within a predetermined range, the CPU 20 may judge that the image qualities of the images of the individual areas have become uniform.

In the flow chart of FIG. 15, after the adjustment has been performed such that the image qualities of the images of the individual areas become uniform, the CPU 20 writes, into the EEPROM 28, correction position information of the focus lens group FL, the zoom lens group ZL, the diaphragm I, and the like and correction position information of the tilt correction lens group 34 in a state that the image qualities of the images of the individual areas have been set uniform (step S118). The correction position information is determined on the basis of the output values of the individual potentiometers FP, ZP, IP, and 34P of the optical system by the CPU 20. As such, the procedure of decentering correction is completed in the lens device 20.

Next, the procedure of actual image taking performed in a state that the lens device 20 is attached to the camera body 40 is described below.

In the lens device 20, when the power is turned ON, the CPU 20 reads the correction position information from the EEPROM 28 (step S120).

Then, on the basis of the read-out correction position information, the CPU 20 drives the individual motors FM, ZM, IM, and 34M (step S122). As such, the lens device 20 is set into an image-taking ready state.

According to the lens device 10 of the present invention, decentering can be adjusted in the lens device in a stand-alone state without the necessity of attaching to the camera body 40. Further, also when maintenance is to be performed in a state that the lens device 10 has been removed from the camera body 40, centering correction can be performed in the lens device 10 in a stand-alone state. This provides user friendliness.

Next, a modification of the configuration of the lens device 10 is described below.

Figure 18:
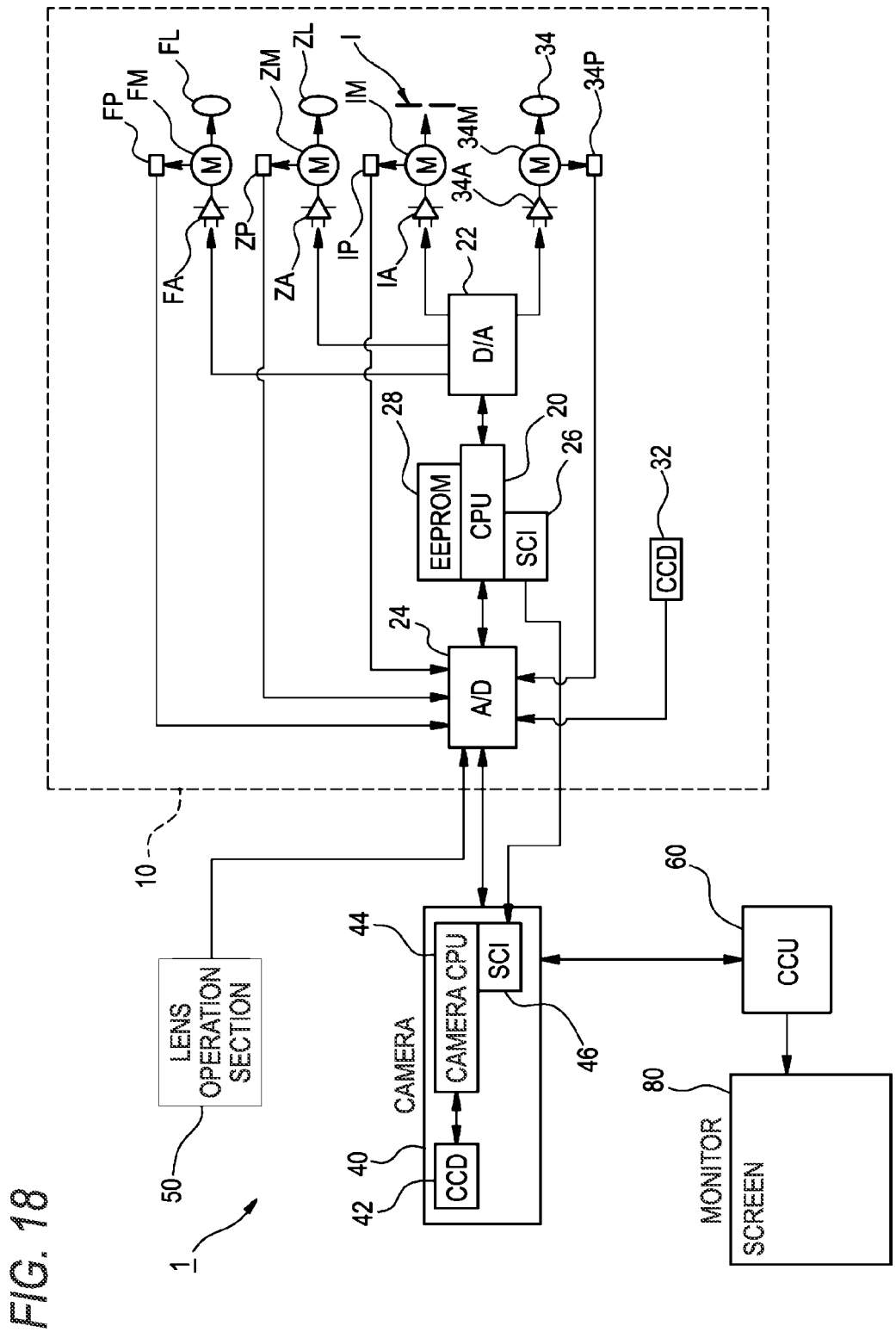
FIG. 18 is a block diagram showing another exemplary configuration of a camera system provided with a lens device.

FIG. 18 shows another exemplary configuration of the lens device 10. The camera system 1 of FIG. 18 is basically the same as that shown in FIG. 12. The following description is given for differences from the configuration of FIG. 1. Then, description of like configurations and members to those of the above-mentioned lens device 10 is simplified or omitted appropriately.

The lens device 10 includes one CCD 32 for focus detection.

Figure 19:
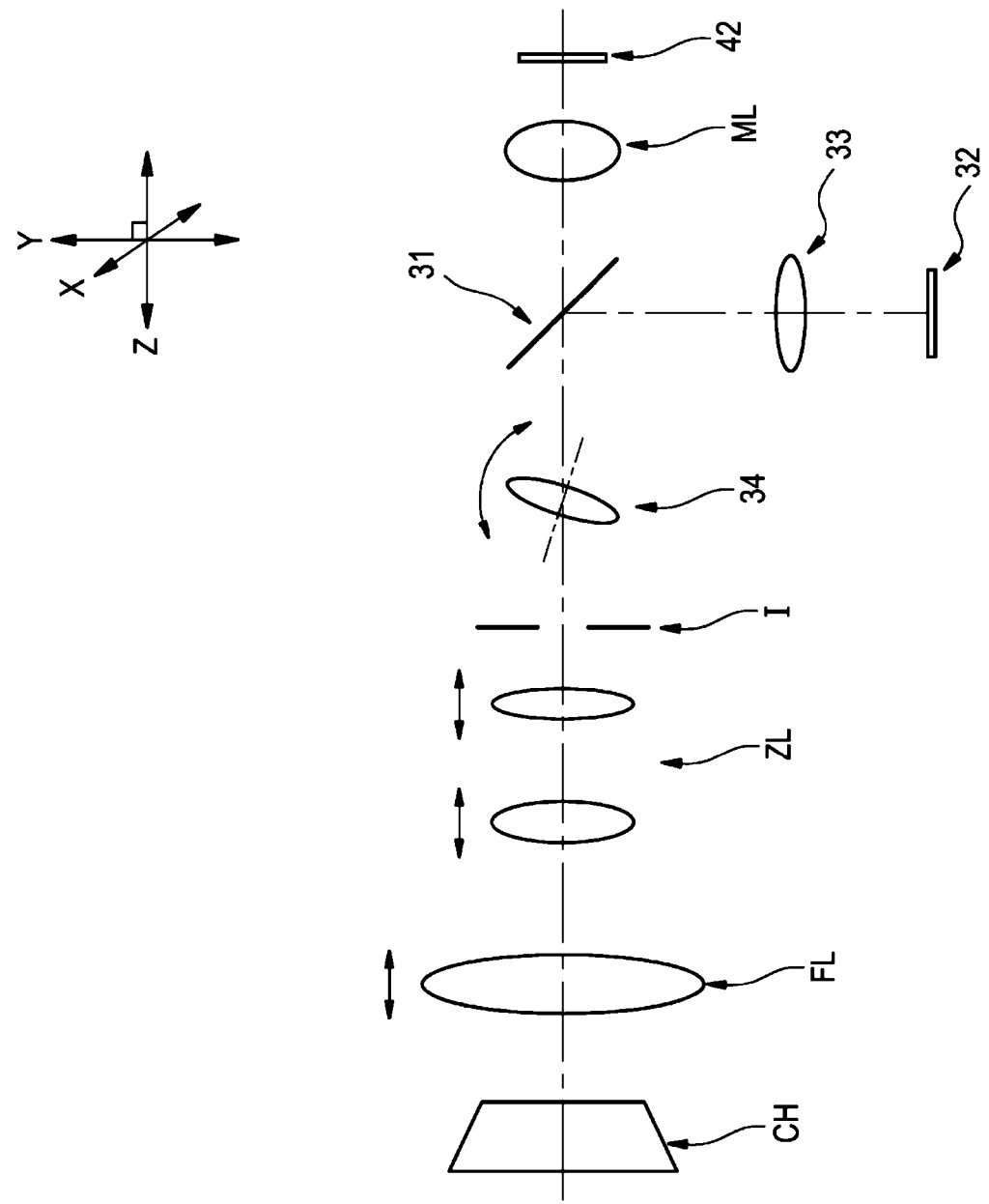
FIG. 19 is a diagram schematically showing an optical system of a camera system of FIG. 18.

FIG. 19 shows the optical system of the lens device 10 of FIG. 18. This optical system is common to the above-mentioned lens device 10 in the point that the focus lens group FL, the zoom lens group ZL, the diaphragm I, the tilt correction lens group 34, the beam splitter 31, and the master lens group ML are provided in this order from the photographic object side to the imaging surface.

In the second optical path, the condenser lens 33 is provided that condenses the light reflected by the beam splitter 31. Then, the CCD 32 is provided at the image formation position of the light beam transmitted through the condenser lens 33. The CCD 32 is used for decentering correction.

Figure 20:
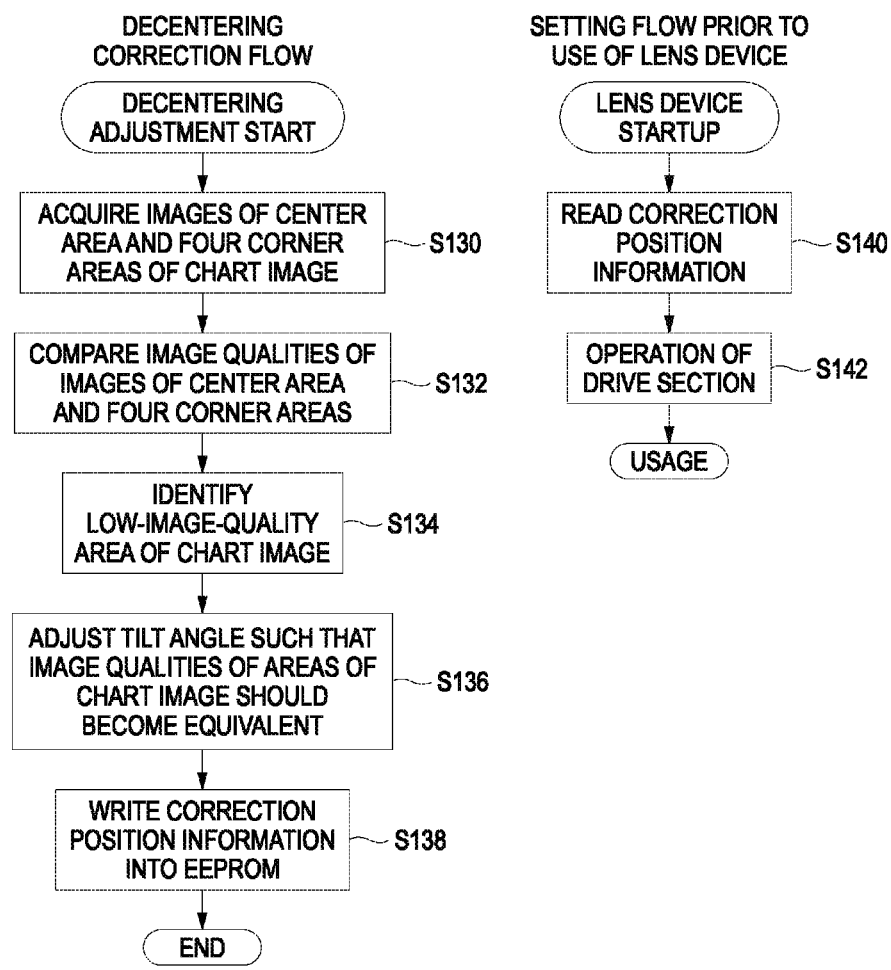
FIG. 20 is a flow chart showing a procedure of performing centering in a lens device of FIG. 18.
Figure 21:
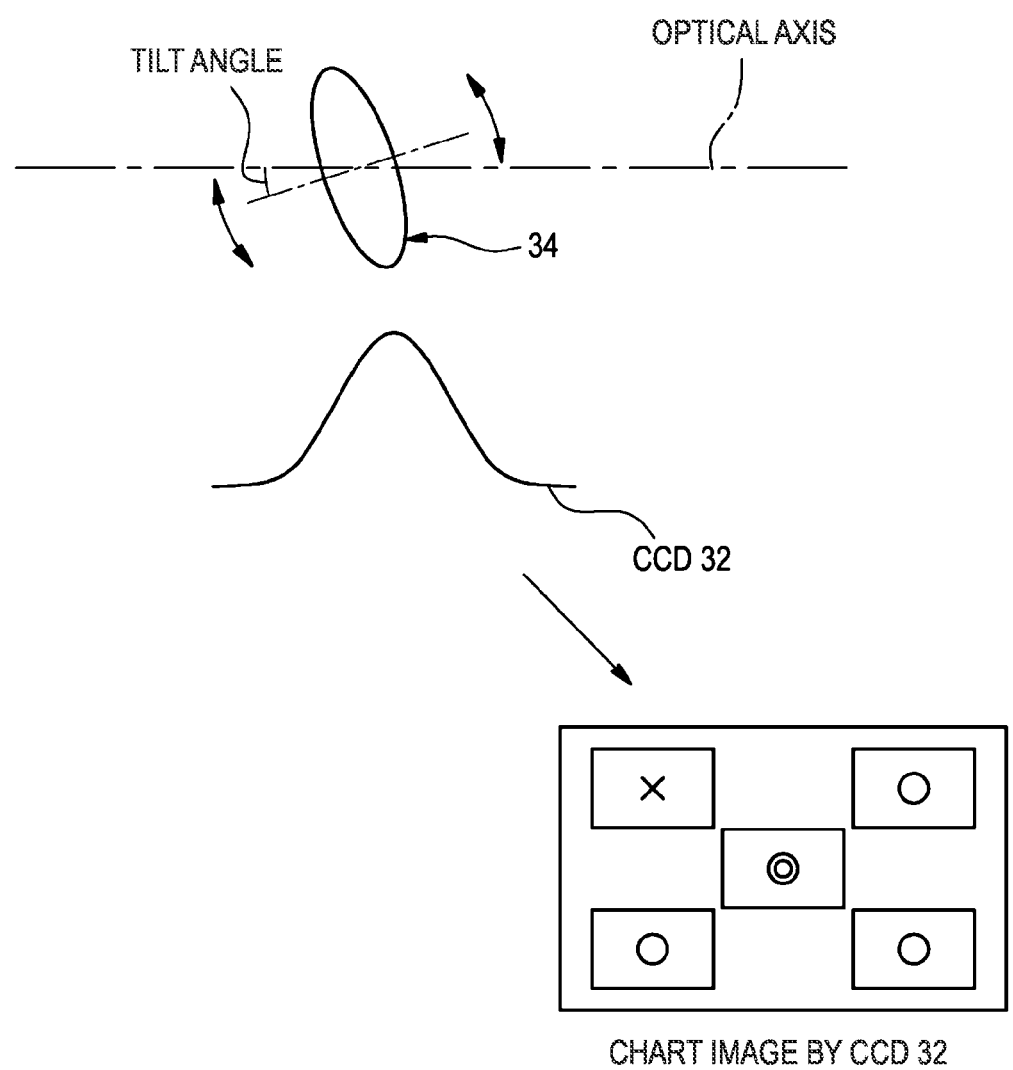
FIG. 21 is a diagram describing a method of setting a tilt angle of a tilt correction lens group on the basis of a chart image in a lens device of FIG. 18.

FIG. 20 is a flow chart showing a procedure of correcting the decentering in the lens device of FIG. 18. FIG. 21 is a diagram describing a method of setting the tilt angle of the tilt correction lens group 34 on the basis of the chart image acquired from the CCD 32.

First, in the lens device 10, when decentering correction is to be performed under the control of the CPU 20, image acquisition is performed on an image quality evaluation chart CH by the CCD 32 as shown in FIG. 19 so that a chart image is acquired. At that time, within the chart image acquired by the CCD 32, a total of five images of the center area and the four corner areas are acquired (step S130). Then, the CPU 20 calculates the contrast values of the image of the center area and the individual images of the four corner areas. In this example, the contrast value is adopted as the evaluation value.

After that, on the basis of the evaluation value calculated in each area, the CPU 20 performs comparison of the image of the center area with the image of each of the other areas (step S132).

With reference to FIG. 21, the image of the center area has the highest contrast. Then, the images of the upper right, the lower right, and the lower left areas have the second highest contrast and the image of the upper right area has the lowest contrast. In FIG. 10, in comparison with the contrast of the image of the center area, the contrast of the image of the upper left area is low and the difference falls outside of a predetermined range. Thus, the image quality of the image of the upper left area is judged to be poor and hence a mark "x" is placed. On the other hand, the contrast values of the images of the upper right, the lower right, and the lower left areas are lower than the contrast of the image of the center area but the difference falls within the predetermined range. Thus, the image qualities of the images of the upper right, the lower right, and the lower left areas are judged to be in an allowable range and hence a mark "○" is placed.

Here, as described above, comparison of the images of the individual areas is performed on the basis of the threshold set up in advance. Further, the method of comparing the images of the individual areas is not limited to the method using the threshold as described above. For example, an average contrast value may be calculated over the contrast values in each area. Then, the image quality of the image of each area may be evaluated on the basis of the average value.

The CPU 20 compares the image qualities of the images of the individual areas as described above so as to identify an area where the image quality of the image acquired by the CCD 32 is the lowest (S134). Then, the CPU 20 drives the tilt correction lens group 34 such that the evaluation value of the image of the area having the low image quality becomes high, and thereby changes the tilt angle so as to perform adjustment such that the image of each area has almost the same image quality (step S136).

In the flow chart of FIG. 20, after the adjustment has been performed such that the image qualities of the images of the individual areas become uniform, the CPU 20 writes, into the EEPROM 28, correction position information of the focus lens group FL, the zoom lens group ZL, the diaphragm I, and the like and correction position information of the tilt correction lens group 34 in a state that the image qualities of the images of the individual areas have been set uniform (step S138). The correction position information is determined on the basis of the output values of the individual potentiometers FP, ZP, IP, and 34P of the optical system by the CPU 20. As such, the procedure of decentering correction is completed in the lens device 20.

Next, the procedure of actual image taking performed in a state that the lens device 10 is attached to the camera body 40 is described below.

In the lens device 10, when the power is turned ON, the CPU 20 reads the correction position information from the EEPROM 28 (step S140).

Then, on the basis of the read-out correction position information, the CPU 20 drives the individual motors FM, ZM, IM, and 34M (step S142). As such, the lens device 20 is set into an image-taking ready state.

According to the lens device 10 of the present invention, as long as the CCD 32 in a singular number is provided, decentering can be adjusted in the lens device in a stand-alone state without the necessity of attaching to the camera body 40. Further, also when maintenance is to be performed in a state that the lens device 10 has been removed from the camera body 40, centering correction can be performed in the lens device 10 in a stand-alone state. This provides user friendliness.

The employed tilt correction lens group described above is not limited to that driven and controlled such as to be tilted relative to the optical axis, and may be that displaced in parallel to the optical axis as described later.

The above-mentioned description has been given for an example that the correction lens group (the decentering correction lens group 12 and the tilt correction lens group 14) is driven and controlled in accordance with the image-taking condition so that the image quality is adjusted. Nevertheless, in some cases, the center of the formed image is displaced in association with the movement of the correction lens group. A lens device constructed such that the displacement of the image center is corrected is described below.

Figure 22:
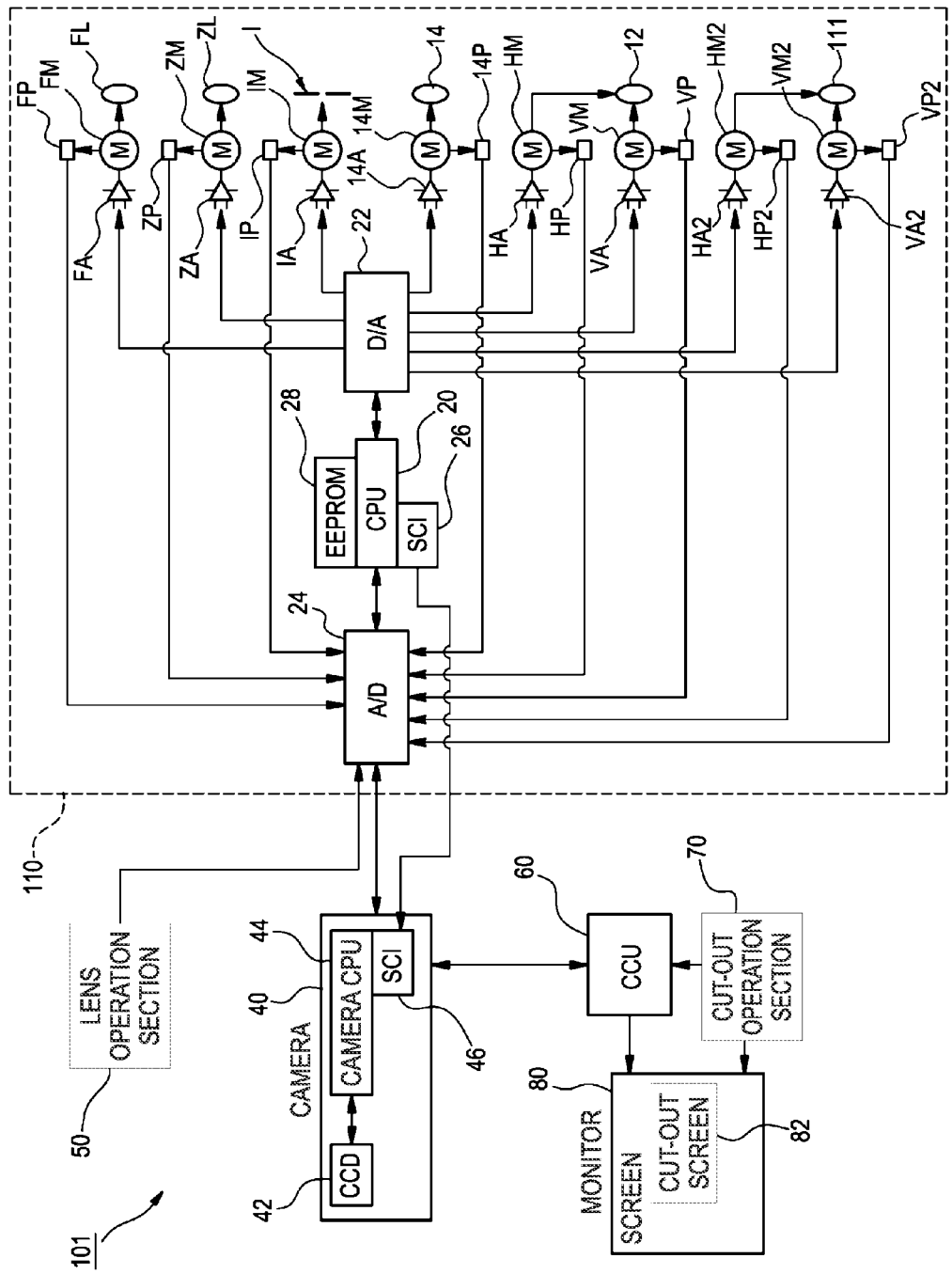
FIG. 22 is a block diagram showing a main configuration of another example of a camera system in order to describe an embodiment of the present invention.
Figures 23, 24:
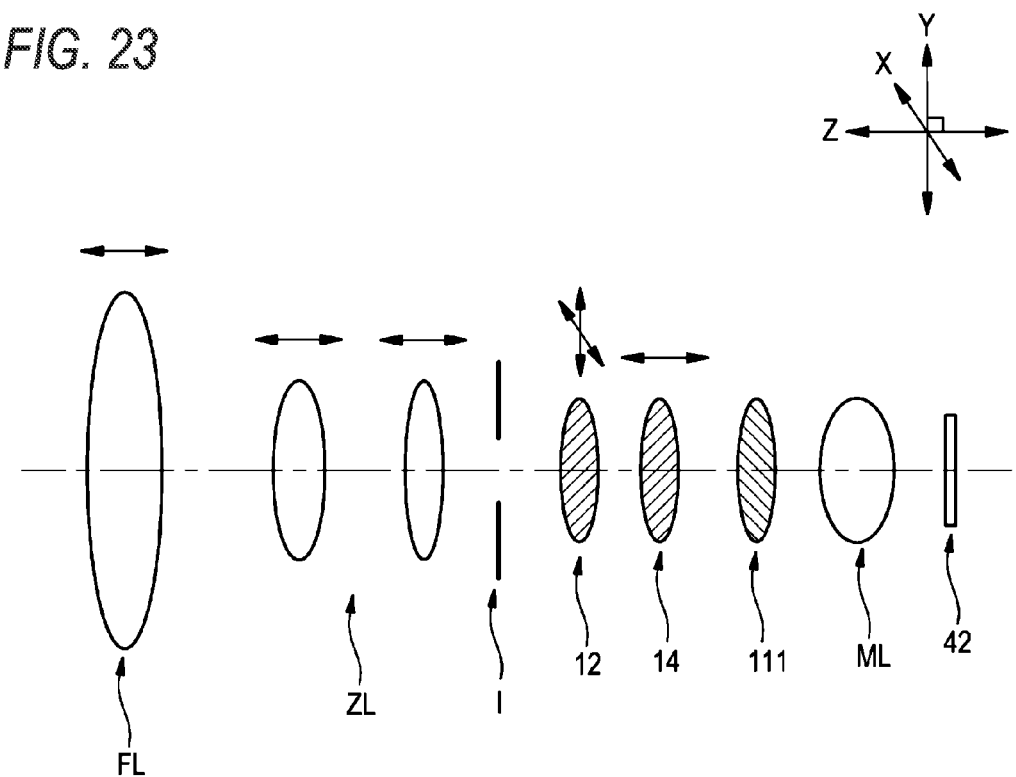
FIG. 23 is a diagram schematically showing an optical system of a camera system of FIG. 22.
FIG. 24 is a diagram showing a data structure of a data table stored in a storage section of a lens device of FIG. 22.

FIG. 22 is a block diagram showing a main configuration of another example of a camera system in order to describe an embodiment of the present invention. FIG. 23 is a diagram schematically showing the optical system of the camera system of FIG. 22. Here, like elements to those of the camera system shown in FIG. 11 are designated by like reference numerals and hence their description is omitted.

The camera system 101 includes a lens device 110 and a camera body 40. The lens device 110 includes a second correction lens group 111 for correcting the displacement of the image center caused by the movement of the correction lens group composed of the decentering correction lens group 12 and the tilt correction lens group 14. Then, in the present example, the second correction lens group 111 is constructed as a camera-shake correction lens group.

The camera-shake correction lens group 111 is provided in a manner of being movable in a plane perpendicular to the optical axis of the optical system (a plane parallel to the X-Y plane in FIG. 23). Then, the lens device 110 includes: motors HM2 and VM2 for driving the camera-shake correction lens group 111; amplifiers HA2 and VA2 for inputting driving signals to the motors HM2 and VM2; potentiometers HP2 and VP2 for acquiring the position of the camera-shake correction lens group 111; and a camera-shake detection sensor (not shown).

When the camera-shake correction lens group is to be controlled, the CPU 20 outputs driving signals through the D/A converter 22 respectively to the amplifiers HA2 and VA2. By virtue of this, the motors HM2 and VM2 connected respectively to the amplifiers HA2 and VA2 are driven at revolving speeds corresponding to the values (the voltages) of the driving signals.

The motor HM2 drives the camera-shake correction lens group 111 in the X-direction in a plane perpendicular to the optical axis. Further, the motor VM2 drives the camera-shake correction lens group 111 in the Y-direction in a plane perpendicular to the optical axis.

From the potentiometer HP2, a voltage signal is outputted that has a value corresponding to the position in the X-direction of the camera-shake correction lens group 111 (a value indicating the absolute position). From the potentiometer VP2, a voltage signal is outputted that has a value corresponding to the position in the Y-direction of the camera-shake correction lens group 111 (a value indicating the absolute position). The voltage signals outputted respectively from the potentiometers HP2 and VP2 are provided through the A/D converter 24 to the CPU 20 so that the camera-shake correction lens group 111 feedback-controlled into the target position by the CPU 20.

The target position of the camera-shake correction lens group 111 is set up such that displacement of the image center caused by the movement of the correction lens group is canceled. This setting is stored in advance in the EEPROM 28 in the form of a data table in which correspondence is established with the positions of the correction lens groups (the decentering correction lens group 12 and the tilt correction lens group 14). The CPU 20 refers to the data table, thereby determines the target position of the camera-shake correction lens group 111 corresponding to the position of the correction lens group (the decentering correction lens group 12 and the tilt correction lens group 14), and then performs the above-mentioned feedback control such that the camera-shake correction lens group 111 is located at the target position.

Next, the data structure of the data table is described below.

FIG. 24 is a diagram showing the data structure of the data table.

The parameter ("d01", "d02", "d03", . . . ) indicating the position information of the decentering correction lens group 12 has a value indicating the absolute position of the decentering correction lens group 12. The parameter ("e01", "e02", "e03", . . . ) indicating the position information of the tilt correction lens group 14 has a value indicating the absolute position of the tilt correction lens group 14.

The parameter ("f01", "f02", "f03", . . . ) indicating the position information of the camera-shake correction lens group 111 has a value indicating the position of the camera-shake correction lens group 111 in a plane perpendicular to the optical axis. These values are coordinates indicating the X-directional position and the Y-directional position of the camera-shake correction lens group 111.

Figure 25:
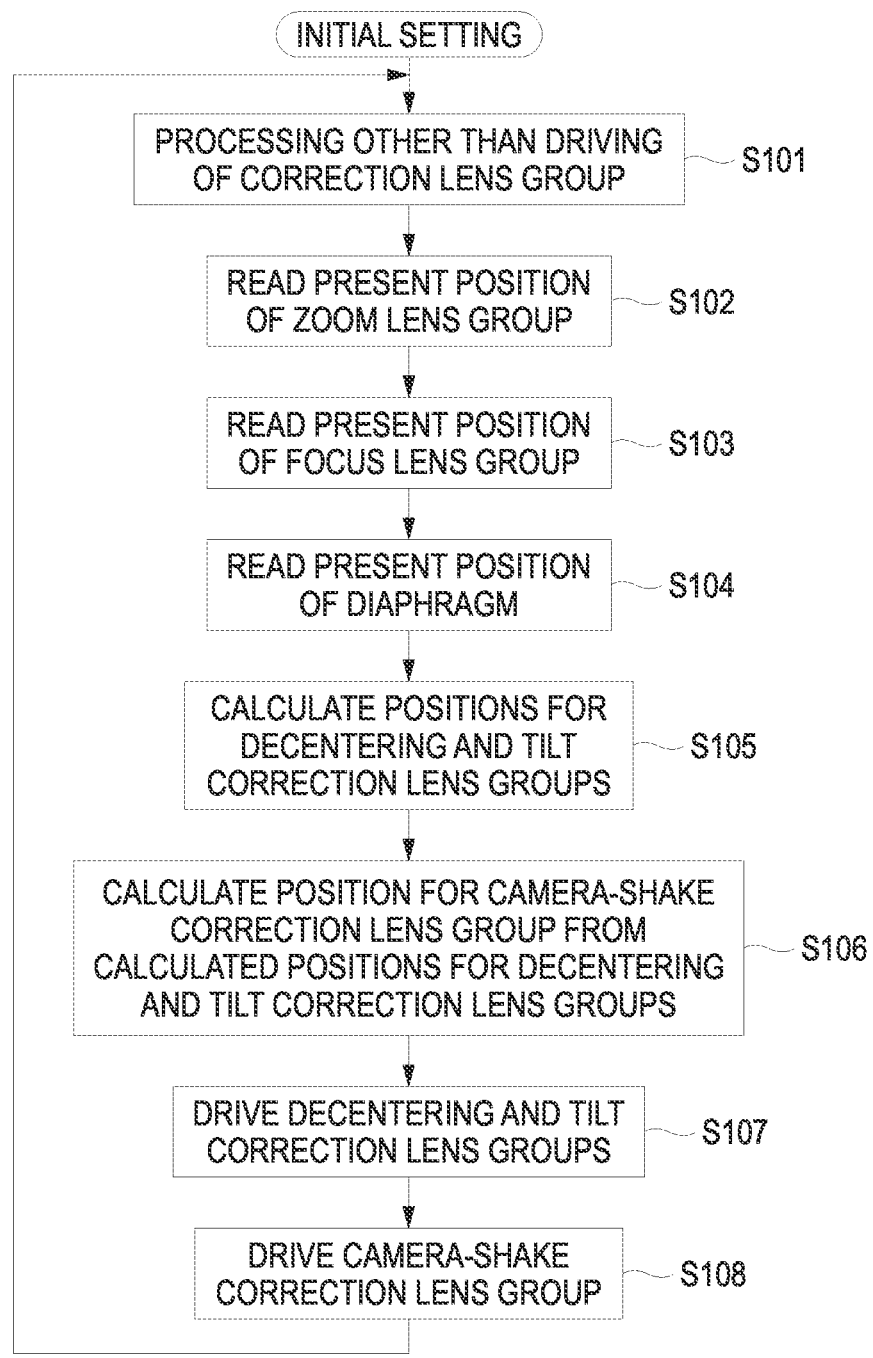
FIG. 25 is a flow chart showing a procedure of correcting displacement of an image center by driving a second correction lens group of a lens device of FIG. 22.

FIG. 25 is a flow chart showing a procedure of correcting the displacement of the image center by driving the camera-shake correction lens group 111. In the following description, the configuration of the camera system 101 of FIG. 22 is referred to, when necessary.

First, the movable lens group, the diaphragm, and the correction lens group are set into a predetermined initial position.

Focusing operation and zooming operation are performed (step S101). Here, operation other than the driving of the correction lens group and the camera-shake correction lens group is executed appropriately.

Then, the CPU 20 reads the output value of the potentiometer ZP so as to detect the present position of the zoom lens group ZL (step S102), then reads the output value of the potentiometer FP so as to detect the present position of the focus lens group FL (step S103), and then reads the output value of the potentiometer IP so as to detect the present diaphragm position of the diaphragm I (step S104). The order of executing the steps S102, S103, and S104 is not limited to this and may be changed appropriately. Alternatively, these steps may be executed simultaneously.

Then, the CPU 20 refers to the data table (see FIG. 13) which is stored in advance in the EEPROM 28 and in which correspondence is established between the positions of the zoom lens group ZL, the focus lens group FL, and the diaphragm I and the positions of the decentering correction lens group 12 and the tilt correction lens group 14. Then, on the basis of the detected positions of the focus lens group FL, the zoom lens group ZL, and the diaphragm I, the CPU 20 acquires positions for the decentering correction lens group 12 and the tilt correction lens group 14 (step S105).

Then, the CPU 20 refers to the data table which is stored in advance in the EEPROM 28 and in which correspondence is established between the positions of the decentering correction lens group 12 and the tilt correction lens group 14 and the position of the camera-shake correction lens group 111. Then, on the basis of the acquired positions for the decentering correction lens group 12 and the tilt correction lens group 14, the CPU 20 acquires a position for the camera-shake correction lens group 111 (step S106).

Then, in accordance with the acquired positions for the decentering correction lens group 12 and the tilt correction lens group 14, the CPU 20 drives and controls the decentering correction lens group 12 and the tilt correction lens group 14 (step S107), and then, in accordance with the acquired position for the camera-shake correction lens group 111, drives and controls the camera-shake correction lens group 111 (step S108).

Here, the order of executing the steps S105, S106, S107, and S108 is not limited to the above-mentioned one. That is, the order of execution may be such that: positions for the decentering correction lens group 12 and the tilt correction lens group 14 are acquired (step S105); on the basis of the acquired positions for the decentering correction lens group 12 and the tilt correction lens group 14, the decentering correction lens group 12 and the tilt correction lens group 14 are driven and controlled (step S107); a position for the camera-shake correction lens group 111 is acquired (step S106); and, in accordance with the acquired position for the camera-shake correction lens group 111, the camera-shake correction lens group 111 is driven and controlled (step S108).

According to the above-mentioned procedure, by virtue of the movement of the decentering correction lens group 12 and the tilt correction lens group 14, the optical performance of the optical system is adjusted in accordance with the image-taking condition. Further, by virtue of the movement of the camera-shake correction lens group 111, displacement of the image center caused by the movement of the decentering correction lens group 12 and the tilt correction lens group 14 is corrected.

Camera-shake correction by the camera-shake correction lens group 111 is achieved such that the position for the camera-shake correction lens group 111 set up by the above-mentioned procedure of correcting the displacement of the image center is adopted as the center and then the camera-shake correction lens group 111 is appropriately moved on the basis of camera-shake detected by the camera-shake detection sensor.

Figure 26:
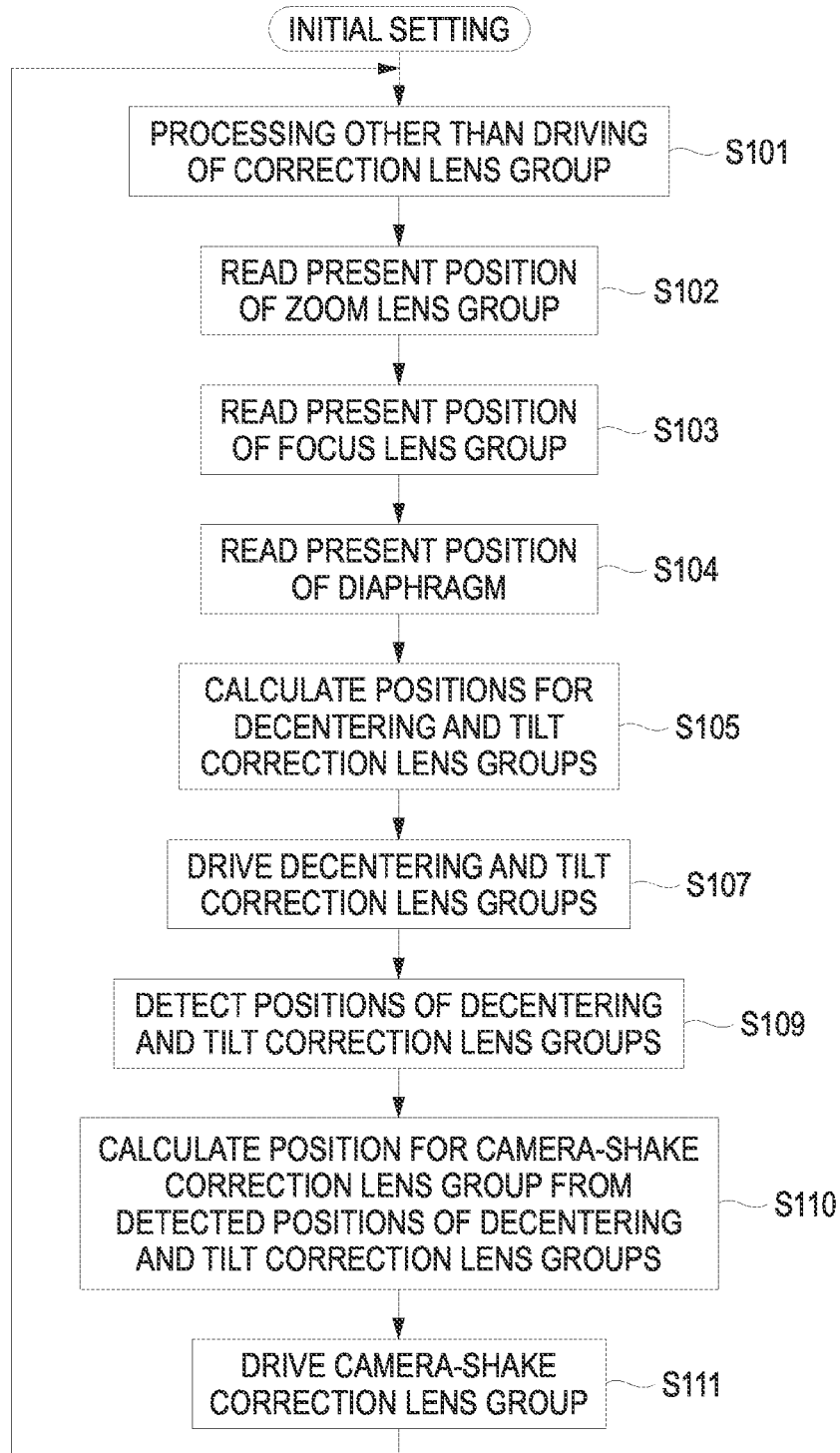
FIG. 26 is a flow chart showing another example of a procedure of correcting displacement of an image center by driving a second correction lens group of a lens device of FIG. 22.

FIG. 26 is a flow chart showing another example of the procedure of correcting the displacement of the image center by driving the camera-shake correction lens group 111.

In the example shown in FIG. 25, at the time that the data table in which correspondence is established between the positions of the decentering correction lens group 12 and the tilt correction lens group 14 and the position of the camera-shake correction lens group 111 is referred to so that a position for the camera-shake correction lens group 111 is acquired, the positions of the decentering correction lens group 12 and the tilt correction lens group 14 are used that have been acquired, on the basis of the positions of the focus lens group FL, the zoom lens group ZL, and the diaphragm I. In contrast, in the example shown in FIG. 26, the positions of the decentering correction lens group 12 and the tilt correction lens group 14 are used that are detected by the potentiometers HP, VP, and 14P.

The CPU 20 refers to the data table which is stored in advance in the EEPROM 28 and in which correspondence is established between the positions of the decentering correction lens group 12 and the tilt correction lens group 14 and the position of the camera-shake correction lens group 111. Then, on the basis of the detected positions of the focus lens group FL, the zoom lens group ZL, and the diaphragm I, the CPU 20 drives and controls the decentering correction lens group 12 and the tilt correction lens group 14 (step S107).

On completion of the movement of the decentering correction lens group 12 and the tilt correction lens group 14, the CPU 20 reads the output values of the potentiometers HP and VP so as to detect the present position of the decentering correction lens group 12 and reads the output value of the potentiometer 14P so as to detect the present position of the tilt correction lens group 14 (step S109).

Then, the CPU 20 refers to the data table which is stored in advance in the EEPROM 28 and in which correspondence is established between the positions of the decentering correction lens group 12 and the tilt correction lens group 14 and the position of the camera-shake correction lens group 111. Then, on the basis of the detected positions of the decentering correction lens group 12 and the tilt correction lens group 14, the CPU 20 acquires a position for the camera-shake correction lens group 111 (step S110) and then drives and controls the camera-shake correction lens group 111 in accordance with the acquired position for the camera-shake correction lens group 111 (step S111).

As such, at the time that the data table in which correspondence is established between the positions of the decentering correction lens group 12 and the tilt correction lens group 14 and the position of the camera-shake correction lens group 111 is referred to so that a position for the camera-shake correction lens group 111 is acquired, the actual positions of the decentering correction lens group 12 and the tilt correction lens group 14 are detected and then the detected position information of these lens groups 12 and 14 is used. This avoids control errors in the drive control of these lens groups 12 and 14 and hence permits more accurate correction of the displacement of the image center.

In the above-mentioned example, displacement of the image center caused by the movement of the decentering correction lens group 12 and the tilt correction lens group 14 is corrected by using the camera-shake correction lens group 111. Instead, a lens group provided in a manner of being movable in a plane perpendicular to the optical axis may be employed separately from the camera-shake correction lens group 111 so that correction may be performed.

Further, the above-mentioned description has been given for a case that: the data table in which correspondence is established between the positions of the zoom lens group ZL, the focus lens group FL, and the diaphragm I and the positions of the decentering correction lens group 12 and the tilt correction lens group 14 and the data table in which correspondence is established between the positions of the decentering correction lens group 12 and the tilt correction lens group 14 and the position of the camera-shake correction lens group 111 are both stored in the EEPROM 28 of the lens device 110; then, with reference to these data tables, the CPU 20 of the lens device 110 acquires positions for the decentering correction lens group 12, the tilt correction lens group 14, and the camera-shake correction lens group 111 and then controls the driving of these lens groups. Instead, storage of the above-mentioned data tables and control of the driving of the lens groups may be performed in the camera body 40.

Figure 27:
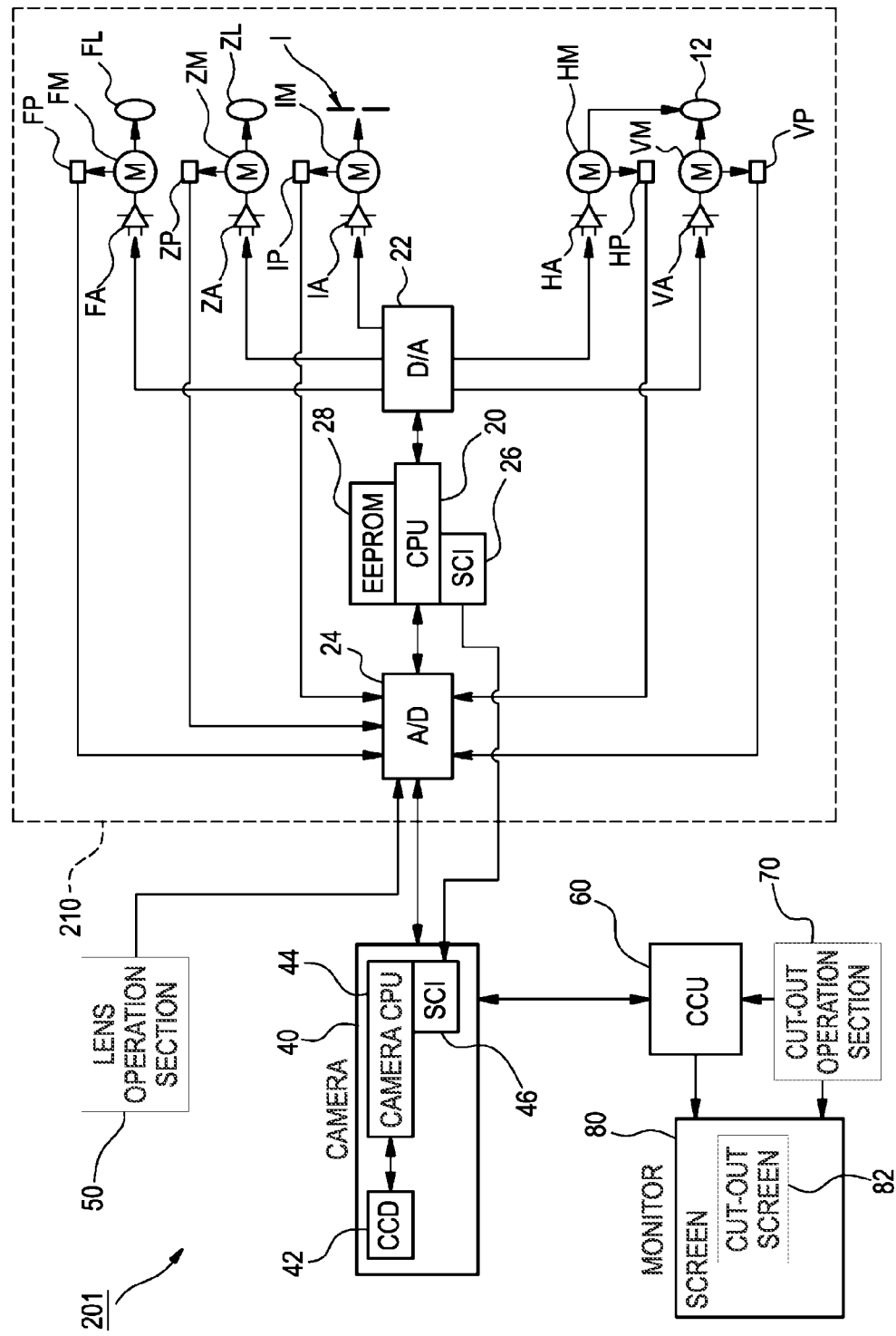
FIG. 27 is a block diagram showing a main configuration of another example of a camera system in order to describe an embodiment of the present invention.
Figure 28:
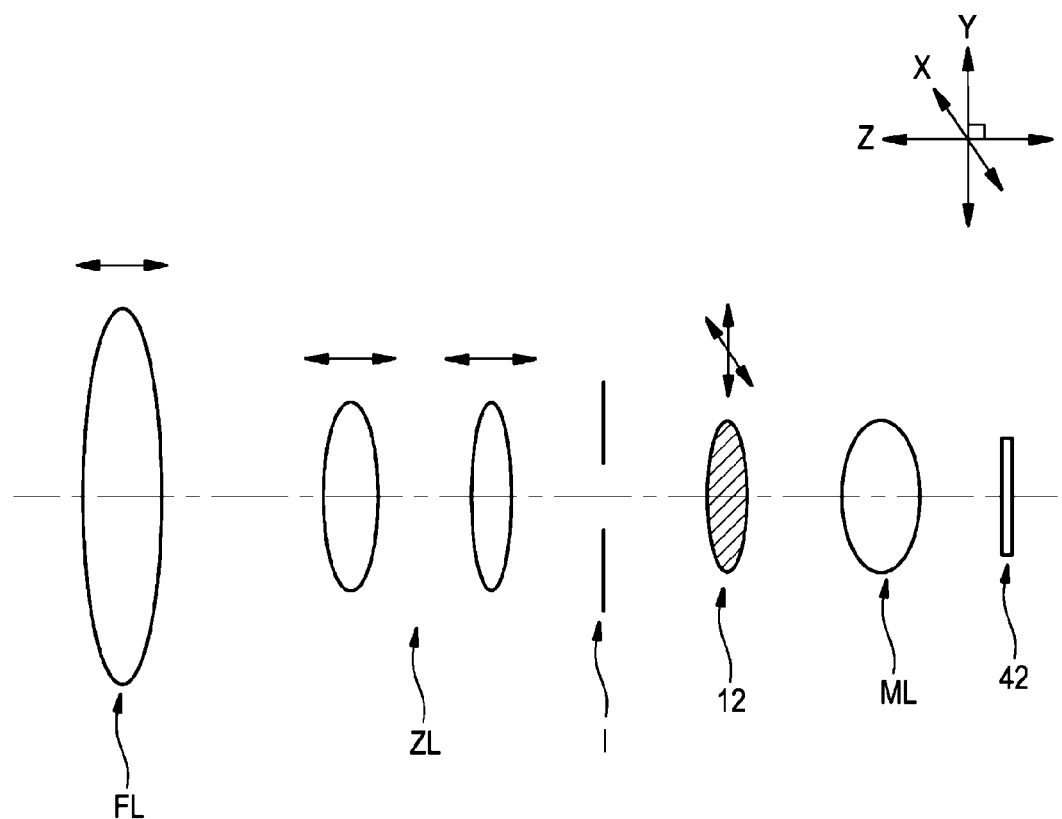
FIG. 28 is a diagram schematically showing an optical system of a camera system of FIG. 27.

FIG. 27 is a block diagram showing a main configuration of another example of a camera system in order to describe an embodiment of the present invention. FIG. 28 is a diagram schematically showing the optical system of the camera system of FIG. 27. Here, like elements to those of the camera system 1 shown in FIG. 11 are designated by like reference numerals and hence their description is omitted.

In the lens device 210 of the camera system 201 shown in FIG. 27, the correction lens group is constructed from the decentering correction lens group 12 moved in a plane perpendicular to the optical axis (a plane parallel to the X-Y plane in FIG. 28). That is, the tilt correction lens group 14 is omitted that constitutes the correction lens group in cooperation with the decentering correction lens group 12 in the lens device 10 of the camera system shown in FIG. 11.

The present camera system 201 has: a centering mode that in accordance with the image-taking condition of the movable lens group, the position of the diaphragm, and the like, the decentering correction lens group 12 is driven and controlled so that the image quality is adjusted; and a non-centering mode that the decentering correction lens group 12 is held at a predetermined position regardless of the image-taking condition. Then, the centering mode and the non-centering mode can be selected in the lens operation section 50 or the camera body 40.

The EEPROM 28 of the lens device 210 stores in advance a data table (for example, see FIG. 13) in which correspondence is established between the image-taking condition and the position information of the decentering correction lens group 12. Further, the EEPROM 28 stores initial position information of the decentering correction lens group 12 obtained when the optical performance is adjusted such that the image qualities in the individual areas of the CCD 42 become uniform at the time of assembly of the lens device 210.

When the centering mode is selected, the CPU 20 drives and controls the motors HM and VM for moving the decentering correction lens group 12 on the basis of the data table stored in the EEPROM 28. When the non-centering mode is selected, the CPU 20 drives and controls the motors HM and VM for moving the decentering correction lens group 12 on the basis of the initial position information stored in the EEPROM 28.

The lens device 210 is provided with a holding section for holding the decentering correction lens group 12. The holding section mechanically engages with a lens frame 12a for supporting the decentering correction lens group 12 and holds at this position the decentering correction lens group 12 moved by the motors HM and VM under the drive control by the CPU 20.

Figure 29:
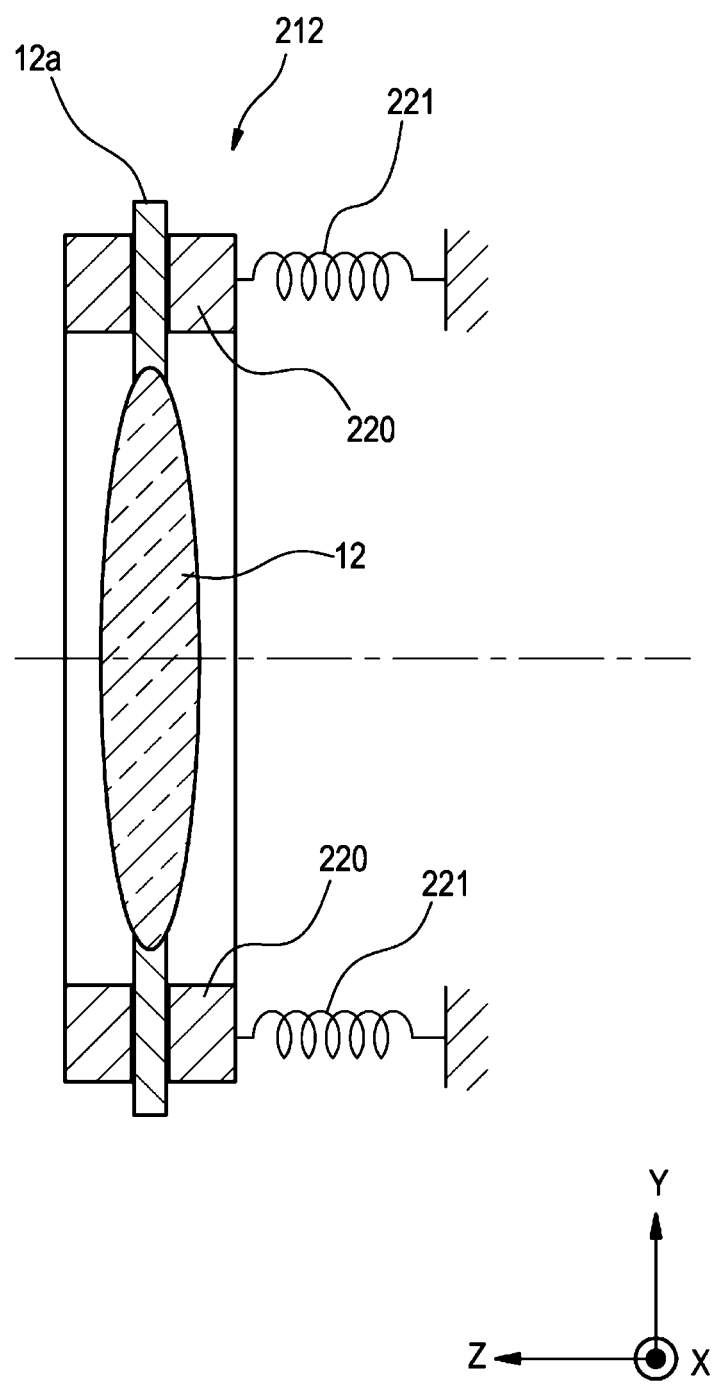
FIG. 29 is a diagram schematically showing a configuration of an example of a holding section for holding a correction lens group of an optical system of FIG. 28.

FIG. 29 shows the configuration of an example of the holding section.

The holding section 212 shown in FIG. 29 includes a friction member 220. Then, the friction member 220 biased in the optical axis direction by springs 221 so as to be in contact with the lens frame 12a. Thus, the friction member 220 always exerts a frictional force on the lens frame 12a in the moving direction of the decentering correction lens group 12 (in the X-direction and the Y-direction) so as to hold the decentering correction lens group 12 at that position. The motors HM and VM move the decentering correction lens group 12 with resisting against the frictional force.

Figure 30:
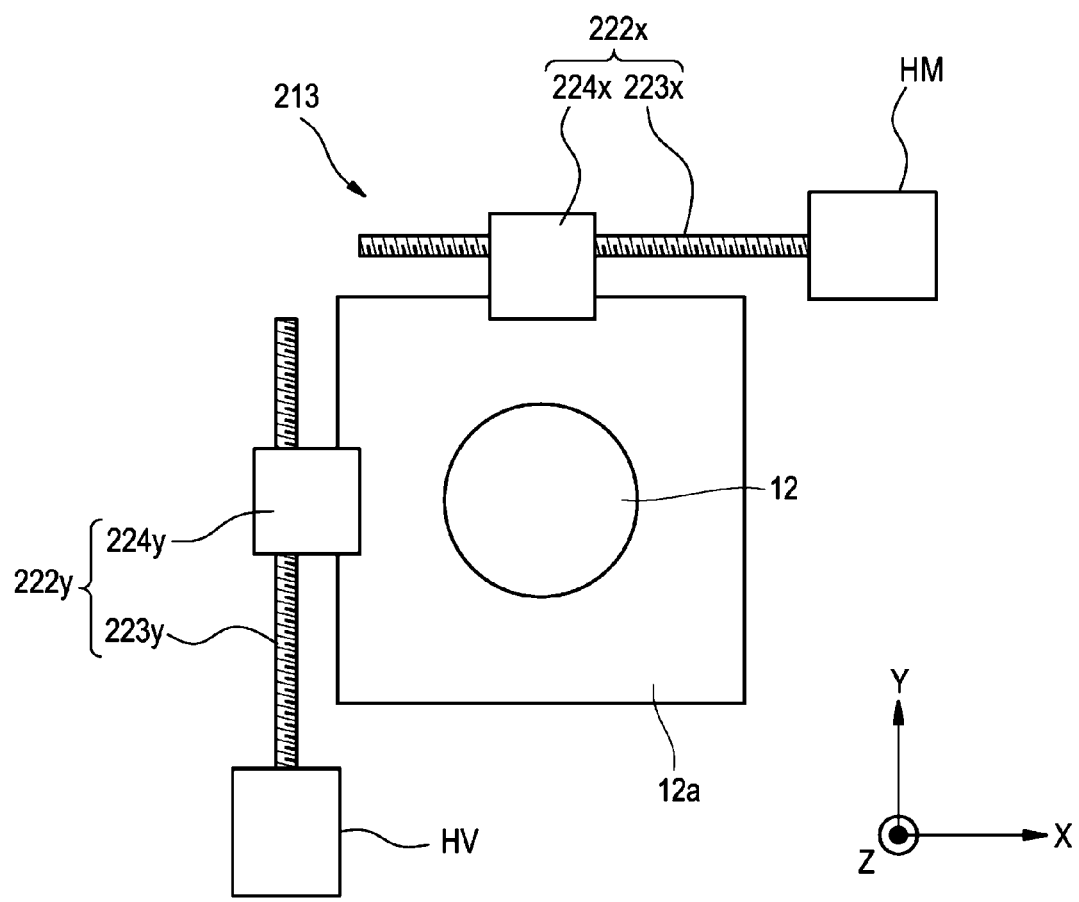
FIG. 30 is a diagram schematically showing a configuration of another example of a holding section.

FIG. 30 shows the configuration of another example of the holding section.

The holding section 213 shown in FIG. 30 includes guide structures 222 each constructed from a feed screw 223 and a nut 224 and provided in the X-direction or the Y-direction. Then, the nut 224x of the guide structure 222x of X-direction restricts the lens frame 12a only in the X-direction and the nut

224y of the guide structure 222y of Y-direction restricts the lens frame 12a only in the Y-direction.

Figure 31:
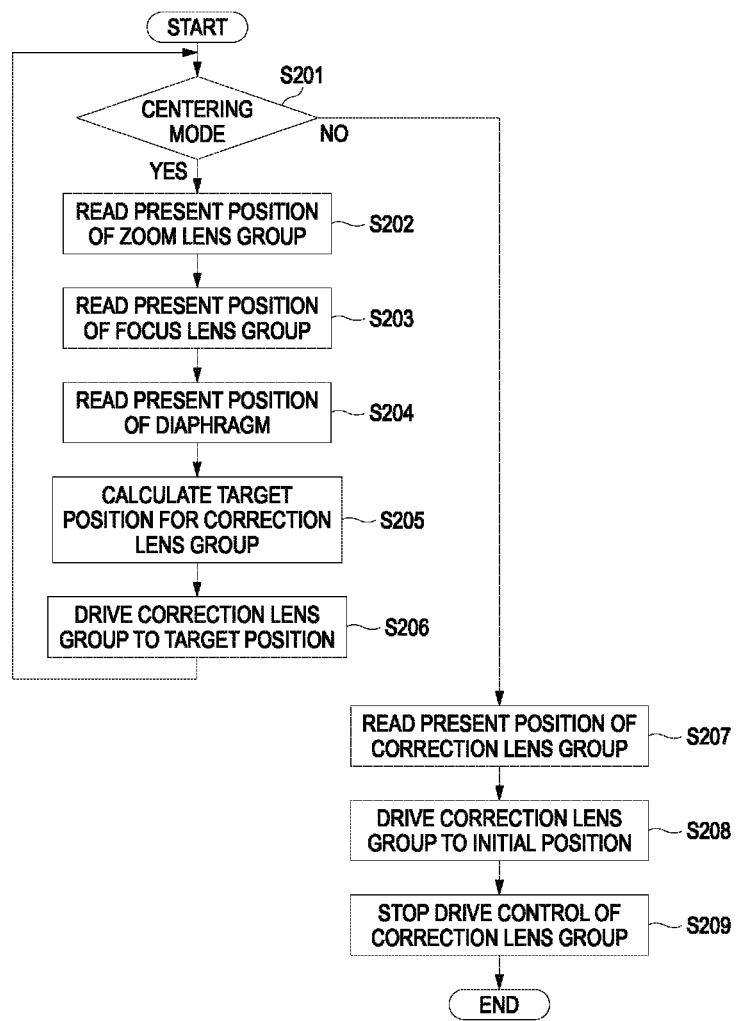
FIG. 31 is a flow chart showing a control process of moving a correction lens group of an optical system of FIG. 28.

FIG. 31 is a flow chart showing a control process of moving the decentering correction lens group 12.

The CPU 20 judges whether the selected mode is the centering mode or the non-centering mode (step S201).

When the centering mode is selected, the CPU 20 reads the output value of the potentiometer ZP so as to detect the present position of the zoom lens group ZL (step S202), then reads the output value of the potentiometer FP so as to detect the present position of the focus lens group FL (step S203), and then reads the output value of the potentiometer IP so as to detect the present diaphragm position of the diaphragm I (step S204).

Then, the CPU 20 refers to a data table (for example, see FIG. 13) which is stored in advance in the EEPROM 28 and in which correspondence of the decentering correction lens group 12 is established to the positions of the zoom lens group ZL, the focus lens group FL, and the diaphragm I. Then, on the basis of the detected positions of the focus lens group FL, the zoom lens group ZL, and the diaphragm I, the CPU 20 acquires a target position for the decentering correction lens group 12 (step S205).

Then, in accordance with the acquired target position of the decentering correction lens group 12, the CPU 20 drives and controls the motors HM and VM for moving the decentering correction lens group 12 (step S206).

When the non-centering mode is selected, the CPU 20 reads the output values of the potentiometers HP and VP so as to detect the present position of the decentering correction lens group 12 (step S207).

Then, the CPU 20 refers to the initial position information of the decentering correction lens group 12 stored in advance in the EEPROM 28 and then, in accordance with the detected position of the decentering correction lens group 12, drives and controls the motors HM and VM for moving the decentering correction lens group 12 so as to move the decentering correction lens group 12 to the initial position (step S208).

Then, after the decentering correction lens group 12 has been moved to the initial position, the CPU 20 stops the drive control of the motors HM and VM for moving the decentering correction lens group 12 (stops electric power supply to the motors HM and VM, the amplifiers HA and VA, and the potentiometers HP and VP) (step S209). The decentering correction lens group 12 is mechanically locked by the holding section 212 or 213 and held at this position.

As such, according to the lens device 210 of the present camera system 201, the decentering correction lens group 12 is moved so that the optical performance of the optical system is adjusted. By virtue of this, high-image quality image taking can be performed regardless of the secular change and a change in the image-taking condition. Then, the holding section 212 for holding the decentering correction lens group 12 at that position engages mechanically with the lens frame 12a for supporting the decentering correction lens group 12 and thereby holds the decentering correction lens group 12 at that position. Thus, no electric power is consumed during the time that the decentering correction lens group 12 is held at that position. This reduces consumption of electric power in the lens device 210.

Here, in the above-mentioned process the image-taking condition (the positions of the focus lens group FL, the zoom lens group ZL, and the diaphragm I) varies every moment. Thus, in the centering mode, the drive control of the motors HM and VM by the CPU 20 is continued (the electric power supply to the motors HM and VM, the amplifiers HA and VA, and the potentiometers HP and VP is continued). However, a configuration may be employed that the CPU 20 monitors a change in the output values of the potentiometers ZP, FP, and IP, then drives and controls the motors HM and VM only in case of presence of a change, and stops the drive control of the motors HM and VM in case of no change. This permits further reduction of consumption of electric power in the lens device 210.

Figure 32:
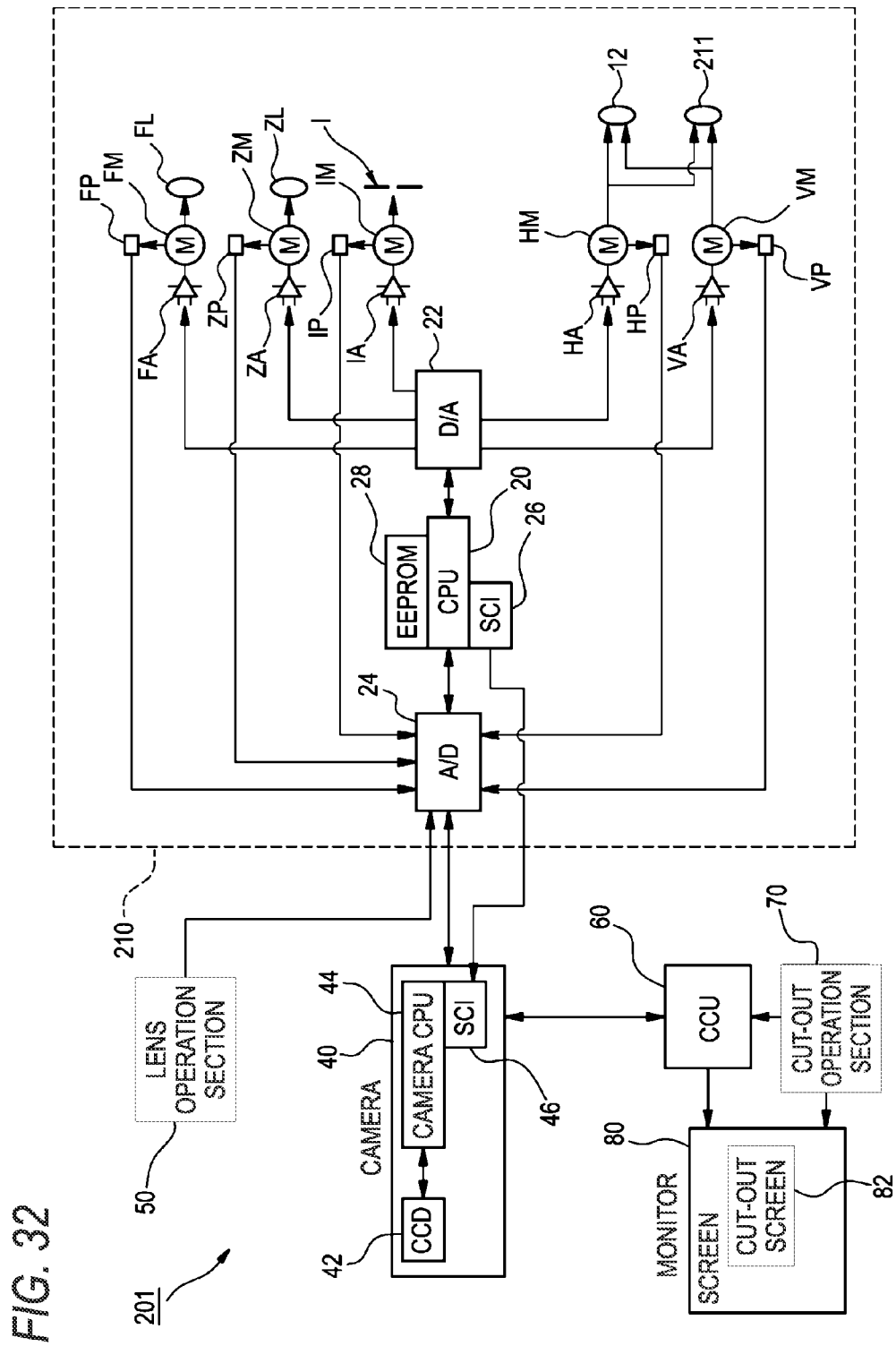
FIG. 32 is a block diagram showing a main configuration of another example of a camera system in order to describe an embodiment of the present invention.
Figure 33:
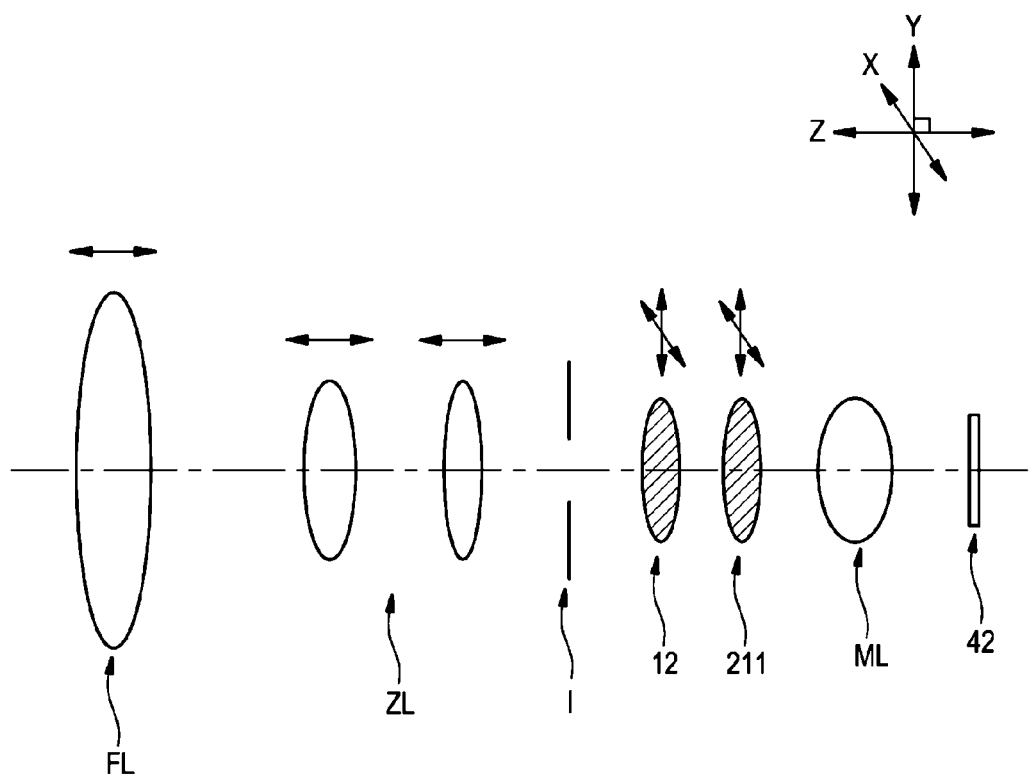
FIG. 33 is a diagram schematically showing an optical system of a camera system of FIG. 32.

FIG. 32 is an example of a main configuration in a modification of the camera system 201. FIG. 33 is a diagram schematically showing the optical system of the camera system of FIG. 32.

In the camera system 201 shown in FIG. 32, the optical system of the lens device 210 is provided with a camera-shake correction lens group 211. Then, the lens device 210 is provided with a camera-shake detection sensor (not shown).

The camera-shake correction lens group 211 is provided in a manner of being movable in a plane perpendicular to the optical axis of the optical system (a plane parallel to the X-Y plane in FIG. 33).

The CPU 20 acquires camera-shake information detected by the above-mentioned camera-shake detection sensor and then controls the drive section for moving the camera-shake correction lens group 211, such as to correct image blur caused by the camera-shake.

Here, the decentering correction lens group 12 can be held at a regular position by the holding section 212. Thus, it is sufficient that the drive section for moving the decentering correction lens group 12 (the motors HM and VM and the amplifiers HA and VA for inputting driving signals to the motors HM and VM) operates only when the decentering correction lens group 12 is moved to the initial position in the above-mentioned non-centering mode or alternatively only when the image-taking condition (the positions of the focus lens group FL, the zoom lens group ZL, and the diaphragm I) has varied in the above-mentioned centering mode.

Thus, in the camera system 201 of the present example, the drive section for moving the camera-shake correction lens group 211 is constructed from: the motors HM and VM for moving the decentering correction lens group 12 provided in a manner of being movable in a plane perpendicular to the optical axis of the optical system similarly to the camera-shake correction lens group 211; and the amplifiers HA and VA for inputting driving signals to the motors HM and VM. Then, the drive section is shared by the decentering correction lens group 12 and the camera-shake correction lens group 211.

In a case that the drive section is shared by the decentering correction lens group 12 and the camera-shake correction lens group 211, a configuration is employed that the target of driving by the drive section can be switched between the decentering correction lens group 12 and the camera-shake correction lens group 211. For example, when voice coil motors of moving coil type are employed as the motors HM and VM, such a coil is provided in each of the decentering correction lens group 12 and the camera-shake correction lens group 211 which are to be driven, and then a magnet is shared so that the drive section can be shared by the decentering correction lens group 12 and the camera-shake correction lens group 211. Then, electric power is supplied selectively to each coil so that the target of driving by the drive section can be switched between the decentering correction lens group 12 and the camera-shake correction lens group 211.

Further, in a case that the drive section is shared by the decentering correction lens group 12 and the camera-shake correction lens group 211, when the decentering correction lens group 12 is driven by the drive section and the camera-shake correction lens group 211 is released from the drive section, the camera-shake correction lens group 211 need be held at a regular position. Thus, a holding section of this purpose is provided. For example, the holding section may be constructed such that the camera-shake correction lens group 211 is restored to the center position (the position where the optical axis of the camera-shake correction lens group agrees with the optical axis of the optical system) by a plurality of springs and then held at the center position by these springs.

Then, the camera system 201 of the present example has: a centering mode that the decentering correction lens group 12 alone is driven and controlled; and a camera-shake correction mode that at least the camera-shake correction lens group 211 is driven and controlled. Further, the camera-shake correction mode has: a first mode that the camera-shake correction lens group 211 alone is driven and controlled; and a second mode that driving of the decentering correction lens group 12 and driving of the camera-shake correction lens group 211 are combined as one cycle and then this cycle is repeated. Then, the centering mode, the first mode, or the second mode can be selected in the lens operation section 50 or the camera body 40. The centering mode is selected, for example, in a case that camera-shake correction is unnecessary like when a tripod is used.

Figure 34:
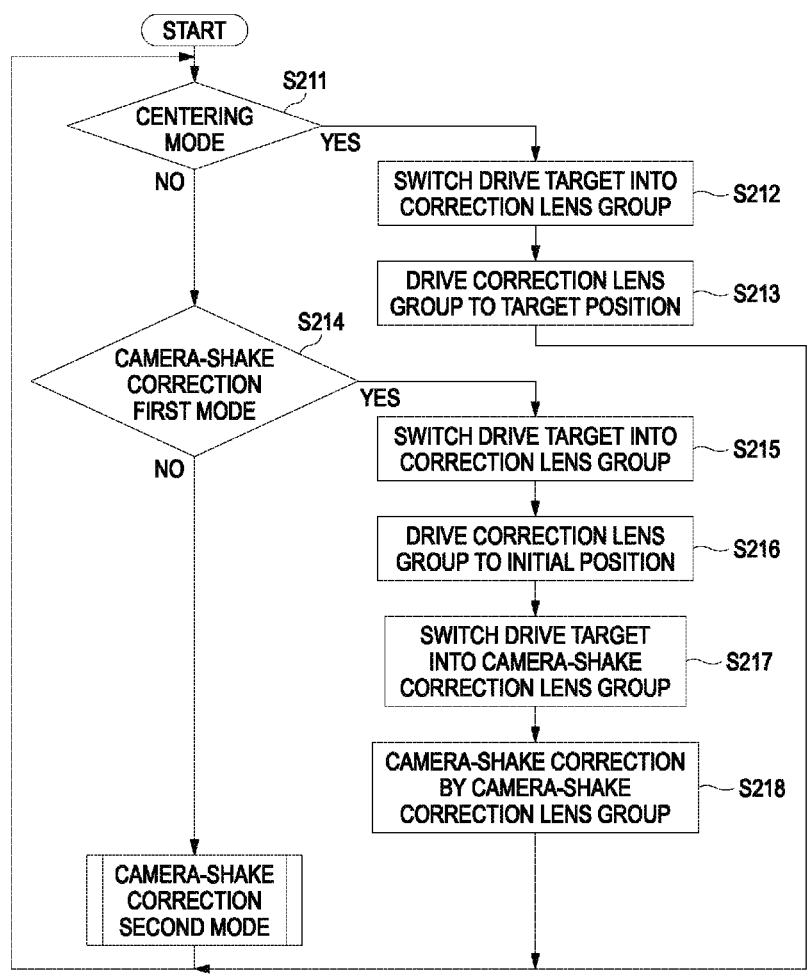
FIG. 34 is a flow chart showing a control process of moving a correction lens group.
Figure 35:
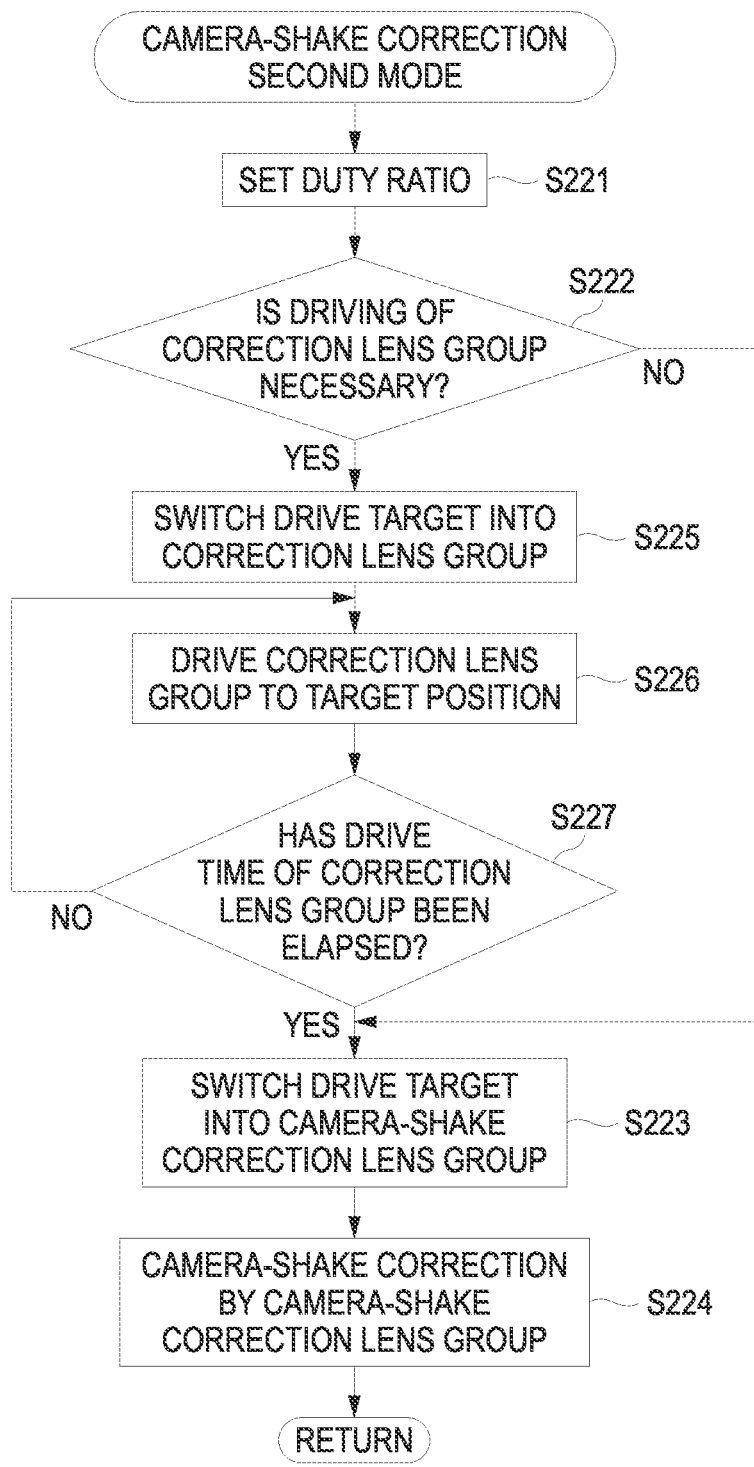
FIG. 35 is a flow chart showing a control process of moving a correction lens group.

FIGS. 34 and 35 are flow charts showing a control process of moving the decentering correction lens group 12.

First, the CPU 20 judges whether the selected mode is the centering mode (step S211).

When the centering mode is selected, the CPU 20 switches the target of driving by the drive section to the decentering correction lens group 12 (step S212).

Then, the CPU 20 executes steps 5202 to 5206 shown in FIG. 31 so as to drive and control the decentering correction lens group 12 into the target position in accordance with the image-taking condition (step S213). Here, a configuration may be employed that during the time that no change occurs in the image-taking condition, drive control of the decentering correction lens group 12 is stopped as described above.

When the centering mode is not selected, the CPU 20 judges whether the selected mode is the first mode (the mode that the camera-shake correction lens group 211 is driven and controlled so that camera-shake correction is performed) (step S214).

When the first mode is selected, the CPU 20 switches the target of driving by the drive section to the decentering correction lens group 12 (step S215) and then executes steps S207 and S208 shown in FIG. 31 so as to move the decentering correction lens group 12 to the initial position (step S216).

Then, after the decentering correction lens group 12 has been moved to the initial position, the CPU 20 switches and fixes the target of driving by the drive section to the camera-shake correction lens group 211 (step S217).

Then, the CPU 20 acquires camera-shake information detected by the above-mentioned camera-shake detection sensor and then drives and controls the camera-shake correction lens group 211, such as to correct image blur caused by the camera-shake (step S218).

When the first mode is not selected, that is, when the second mode (the mode that driving of the decentering correction lens group 12 and driving of the camera-shake correction lens group 211 are combined as one cycle and then this cycle is repeated) is selected, the CPU 20 sets up a time fraction (a duty ratio) in which the decentering correction lens group 12 is to be driven per one cycle (step S221). A method of setting up the duty ratio is described later.

Then, the CPU 20 judges the necessity or non-necessity of drive control of the decentering correction lens group 12 in accordance with the image-taking condition (step S222).

When it is judged that the drive control of the decentering correction lens group 12 is unnecessary in accordance with the image-taking condition, that is, no change has occurred in the image-taking condition, the CPU 20 switches the target of driving by the drive section to the camera-shake correction lens group 211 (step S223).

Then, until the time of driving the camera-shake correction lens group 211 per one cycle defined by the above-mentioned duty ratio elapses, the CPU 20 acquires the camera-shake information detected by the above-mentioned camera-shake detection sensor, and then drives and controls the camera-shake correction lens group 211 such as to correct image blur caused by the camera-shake (step S224).

When it is judged that the drive control of the decentering correction lens group 12 is necessary in accordance with the image-taking condition, that is, a change has occurred in the image-taking condition, the CPU 20 switches the target of driving by the drive section to the decentering correction lens group 12 (step S225).

Then, the CPU 20 executes steps S202 to S206 shown in FIG. 31 so as to drive and control the decentering correction lens group 12 into the target position in accordance with the image-taking condition (step S226).

Then, the CPU 20 waits until the time of driving the decentering correction lens group 12 per one cycle set up as the above-mentioned duty ratio has elapsed (step S227). Then after the time has elapsed, the CPU 20 switches the target of driving by the drive section to the camera-shake correction lens group 211 (step S223).

Then, until the time of driving the camera-shake correction lens group 211 per one cycle defined by the above-mentioned duty ratio elapses, the CPU 20 acquires the camera-shake information detected by the above-mentioned camera-shake detection sensor, and then drives and controls the camera-shake correction lens group 211 such as to correct image blur caused by the camera-shake (step S224).

Here, in place of the waiting until the time of driving the decentering correction lens group 12 per one cycle has elapsed (step S227), a configuration may be employed that after the decentering correction lens group 12 reaches the target position, the target of driving by the drive section is switched to the camera-shake correction lens group 211.

Figure 36:
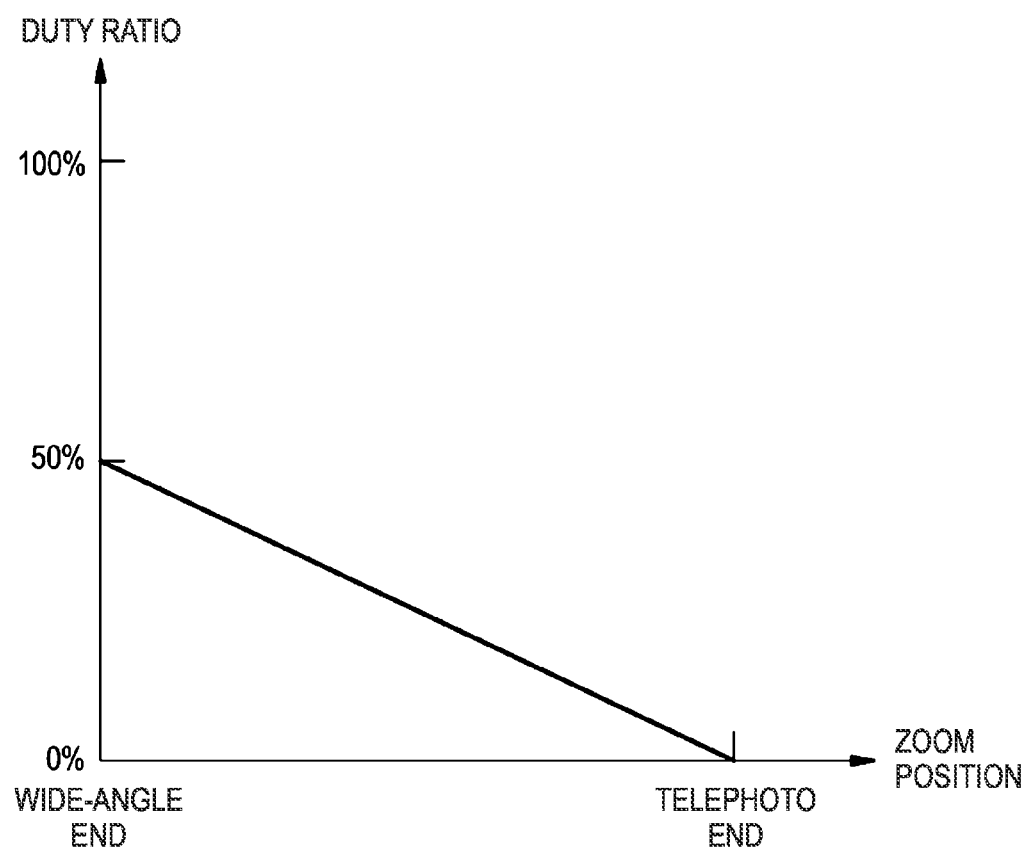
FIG. 36 is a diagram for describing a method of setting a duty ratio in a control process of FIG. 35.

FIG. 36 is a diagram for describing an example of a method of setting the duty ratio.

The duty ratio (the time fraction in which the decentering correction lens group 12 is driven per one cycle) may be fixed, for example, to 50% regardless of the image-taking condition. However, in the camera system 201 of the present example, the value is changed in accordance with the image-taking condition.

FIG. 36 shows an example that the duty ratio is set up in accordance with the position of the zoom lens group ZL. Here, in general, the influence of camera-shake increases as the zoom position moves from the wide-angle end to the telephoto end. Thus, in the example shown in FIG. 36, the duty ratio is set to be 50% at the wide-angle end and 0% at the telephoto end, and then appropriate interpolation is employed in the interval between the two limits. Here, linear interpolation is employed in the example shown in the figure. Instead, curve interpolation may be employed.

Further, the setting of the duty ratio may be performed in accordance with the position of the focus lens group FL. In general, the influence of camera-shake increases as the focus position moves from the near limit to the ∞ limit. Thus, for example, the duty ratio may be set to be 50% at the near limit and 0% at the ∞ limit, and then appropriate interpolation may be employed in the interval between the two limits.

Further, the setting of the duty ratio may be performed in accordance with the position of the diaphragm I. In general, the influence of camera-shake increases as the diaphragm position moves from full open to minimum open. Thus, for example, the duty ratio may be set to be 50% at full open and 0% at minimum open, and then appropriate interpolation may be employed in the interval between the two limits.

The EEPROM 28 of the lens device 210 stores in advance a data table in which correspondence of the duty ratio is established to the position of the zoom lens group ZL, the position of the focus lens group FL, and the position of the diaphragm I. Then, the CPU 20 refers to the data table stored in the EEPROM 28 and then, on the basis of the detected positions of the zoom lens group ZL, the focus lens group FL, and the diaphragm I, sets up the duty ratio.

As such, the drive section is shared by the decentering correction lens group 12 and the camera-shake correction lens group 211 so that size reduction and weight reduction are achieved in the lens device 210. Further, power consumption in the lens device 210 can be reduced further.

Here, the above-mentioned description has been given for a case that selection between the centering mode that the decentering correction lens group 12 alone is driven and controlled and the camera-shake correction mode (the first mode or the second mode) that at least the camera-shake correction lens group 211 is driven and controlled is performed in the lens operation section 50 or the camera body 40. Instead, for example, a mode to be adopted when camera-shake correction is performed may be selected from the first mode and the second mode and then may be set up in advance in the lens operation section 50 or the camera body 40. Then, in accordance with the detection result of the above-mentioned camera-shake detection sensor, the CPU 20 may switch the centering mode and the camera-shake correction mode.

The present specification discloses the following technical matter:

(1) A lens system for a camera, comprising: an image formation optical system including a movable lens group and a correction lens group whose position relative to an optical axis is changed so that optical performance of each portion of an image is corrected; a drive section driving the correction lens group; a lens position acquisition section acquiring a lens position of the movable lens group; a specification section specifying a partial image of a part of region in the image; a storage section storing a data table in which correspondence is established between position information of both of the movable lens group and the correction lens group and the optical performance of each portion of the image; and a control section, in accordance with the lens position of the movable lens group acquired by the lens position acquisition section, on the basis of the data table, acquiring a position for the correction lens group that improves the optical performance of the partial image specified by the specification section and then controlling the drive section such as to move the correction lens group to the acquired position.

(2) The lens system according to (1), in which the correction lens group includes a decentering correction lens group whose position is changed in a plane perpendicular to the optical axis, and in which the control section acquires a position for the decentering correction lens group that improves the optical performance of a center of the partial image and then controls the drive section such as to move the decentering correction lens group to the acquired position.

(3) The lens system according to (1) or (2), in which the correction lens group includes a tilt correction lens group whose optical axis direction position is changed, and in which the control section acquires a position for the tilt correction lens group that improves the optical performance of entirety of the partial image and then controls the drive section such as to move the tilt correction lens group to the acquired position.

(4) The lens system according to any one of (1) to (3), in which the control section acquires the position for the correction lens group that maximizes the optical performance of the partial image specified by the specification section and then controls the drive section such as to move the correction lens group to the acquired position.

(5) The lens system according to any one of (1) to (4), in which the optical system further includes a diaphragm, and in addition to the position information, the data table includes opening position information of the diaphragm.

(6) The lens system according to any one of (1) to (5), in which the optical performance is an MTF or a resolution.

(7) The lens system according to any one of (1) to (6), in which the specification section includes an image processing section cutting out and outputting the partial image of a predetermined area in the image and specifies the partial image within the area to be cut out by the image processing section.

(8) The lens system according to any one of (1) to (6), in which the specification section includes a face detection section recognizing a face of a person from the image and then setting a face frame containing the recognized face and specifies the partial image within the face frame set up by the face detection section.

(9) The lens system according to any one of (1) to (6), in which the specification section includes a contrast detection section dividing the image into a plurality of areas and then detecting an area having a maximum contrast among the plurality of areas and specifies the partial image within the area detected by the contrast detection section.

(10) A camera system including a lens device and a camera body, in which the lens device includes: an image formation optical system including a movable lens group and a correction lens group whose position relative to an optical axis is changed so that optical performance of each portion of an image is corrected; and a drive section driving the correction lens group; and a lens position acquisition section acquiring a lens position of the movable lens group, and in which the camera body includes: an image capturing element acquiring the image formed by imaging performed by the image formation optical system; a specification section specifying a partial image of a part of region in the image acquired by the image capturing element; a storage section storing a data table in which correspondence is established between position information of both of the movable lens group and the correction lens group and the optical performance of each portion of the image; and a control section, in accordance with the lens position of the movable lens group acquired by the lens position acquisition section, on the basis of the data table, acquiring a position for the correction lens group that improves the optical performance of the partial image specified by the specification section and then controlling the drive section such as to move the correction lens group to the acquired position.

(11) The camera system according to (10), in which the correction lens group includes a decentering correction lens group whose position is changed in a plane perpendicular to the optical axis, and in which the control section acquires a position for the decentering correction lens group that improves the optical performance of a center of the partial image and then controls the drive section such as to move the decentering correction lens group to the acquired position.

(12) The camera system according to (10) or (11), in which the correction lens group includes a tilt correction lens group whose optical axis direction position is changed, and in which the control section acquires a position for the tilt correction lens group that improves the optical performance of entirety of the partial image and then controls the drive section such as to move the tilt correction lens group to the acquired position.

(13) The camera system according to any one of (10) to (12), in which the control section acquires the position for the correction lens group that maximizes the optical performance of the partial image specified by the specification section and then controls the drive section such as to move the correction lens group to the acquired position.

(14) The camera system according to any one of (10) to (13), in which the optical system further includes a diaphragm, and in addition to the position information, the data table includes opening position information of the diaphragm.

(15) The camera system according to any one of (10) to (14), in which the optical performance is an MTF or a resolution.

(16) The camera system according to any one of (10) to (15), in which the specification section includes an image processing section cutting out and outputting the partial image of a predetermined area in the image and specifies the partial image within the area to be cut out by the image processing section.

(17) The camera system according to (16), in which the camera body includes: a display section displaying the image and the partial image; and an operation section changing a position of the predetermined area in the image.

(18) The camera system according to any one of (10) to (15), in which the specification section includes a face detection section recognizing a face of a person from the image and then setting a face frame containing the recognized face and specifies the partial image within the face frame set up by the face detection section.

(19) The camera system according to any one of (10) to (15), in which the specification section includes a contrast detection section dividing the image into a plurality of areas and then detecting an area having a maximum contrast among the plurality of areas and specifies the partial image within the area detected by the contrast detection section.

INDUSTRIAL APPLICABILITY

According to the present invention, a lens system and a camera system can be provided in which at the time of image taking, on the basis of the conditions of the optical system such as a movable lens group, the image quality of an image of a part of areas in an entire screen can be adjusted.

The present invention has been described in detail with reference to particular embodiments. However, the person skilled in the art would obviously recognize that various changes and modifications may be made without departing from the spirit and the scope of the present invention.

This application is based on Japanese patent application (Patent Application No. 2011-215637) filed on Sep. 29, 2011, Japanese patent application (Patent Application No. 2011-215638) filed on Sep. 29, 2011, and Japanese patent application (Patent Application No. 2011-215639) filed on Sep. 29, 2011, whose contents are incorporated herein by reference.

REFERENCE SIGNS LIST

1 Camera system
10 Lens device
12 Decentering correction lens group
14 Tilt correction lens group
20 CPU
40 Camera body
42 CCD
44 Camera CPU
50 Lens operation section
52 Face detection section
54 Contrast detection section
70 Cut-out operation section
FL Focus lens group
ZL Zoom lens group
I Diaphragm

The invention claimed is:

1. A lens system for a camera, comprising:
an image formation optical system including a movable lens group, a first correction lens group whose position relative to an optical axis is changed so that optical performance of each portion of an image is corrected and a second correction lens group whose position is changed in a plane perpendicular to the optical axis so that a position of a image center is adjusted;
a drive section driving the first correction lens group and the second correction lens group;
a lens position acquisition section acquiring a lens position of the movable lens group;
a specification section specifying a partial image of a part of region in the image;
a storage section storing a data table in which correspondence is established between position information of both of the movable lens group and the first correction lens group and the optical performance of each portion of the image; and
a control section, in accordance with the lens position of the movable lens group acquired by the lens position acquisition section, on the basis of the data table, acquiring a position for the first correction lens group that improves the optical performance of the partial image specified by the specification section and then controlling the drive section such as to move the first correction lens group to the acquired position, and move the second correction lens group for correcting displacement of the image center by the movements of the first correction lens group and the movable lens group on the basis of the position information of the first correction lens group.

2. The lens system according to claim 1, wherein
the first correction lens group includes a decentering correction lens group whose position is changed in the plane perpendicular to the optical axis, and wherein
the control section acquires a position for the decentering correction lens group that improves the optical performance of a center of the partial image and then controls the drive section such as to move the decentering correction lens group to the acquired position.

3. The lens system according to claim 1, wherein
the first correction lens group includes a tilt correction lens group whose optical axis direction position is changed, and wherein
the control section acquires a position for the tilt correction lens group that improves the optical performance of entirety of the partial image and then controls the drive section such as to move the tilt correction lens group to the acquired position.

4. The lens system according to claim 1, wherein
the control section acquires the position for the first correction lens group that maximizes the optical performance of the partial image specified by the specification section and then controls the drive section such as to move the first correction lens group to the acquired position.

5. The lens system according to claim 1, wherein
the optical system further includes a diaphragm, and
in addition to the position information, the data table includes opening position information of the diaphragm.

6. The lens system according to claim 1, wherein
the optical performance is an MTF or a resolution.

7. The lens system according to claim 1, wherein
the specification section includes an image processing section cutting out and outputting the partial image of a predetermined area in the image and specifies the partial image within the area to be cut out by the image processing section.

8. The lens system according to claim 1, wherein
the specification section includes a face detection section recognizing a face of a person from the image and then setting a face frame containing the recognized face and specifies the partial image within the face frame set up by the face detection section.

9. The lens system according to claim 1, wherein
the specification section includes a contrast detection section dividing the image into a plurality of areas and then detecting an area having a maximum contrast among the plurality of areas and specifies the partial image within the area detected by the contrast detection section.

10. A camera system including a lens device and a camera body, wherein
the lens device includes:
an image formation optical system including a movable lens group, a first correction lens group whose position relative to an optical axis is changed so that optical performance of each portion of an image is corrected and a second correction lens group whose position is changed in a plane perpendicular to the optical axis so that a position of a image center is adjusted; and
a drive section driving the first correction lens group and the second correction lens group; and
a lens position acquisition section acquiring a lens position of the movable lens group, and wherein
the camera body includes:
an image capturing element acquiring the image formed by imaging performed by the image formation optical system;
a specification section specifying a partial image of a part of region in the image acquired by the image capturing element;
a storage section storing a data table in which correspondence is established between position information of both of the movable lens group and the first correction lens group and the optical performance of each portion of the image; and
a control section, in accordance with the lens position of the movable lens group acquired by the lens position acquisition section, on the basis of the data table, acquiring a position for the first correction lens group that improves the optical performance of the partial image specified by the specification section and then controlling the drive section such as to move the first correction lens group to the acquired position, and move the second correction lens group for correcting displacement of the image center by the movements of the first correction lens group and the movable lens group on the basis of the position information of the first correction lens group.

11. The camera system according to claim 10, wherein
the first correction lens group includes a decentering correction lens group whose position is changed in the plane perpendicular to the optical axis, and wherein
the control section acquires a position for the decentering correction lens group that improves the optical performance of a center of the partial image and then controls the drive section such as to move the decentering correction lens group to the acquired position.

12. The camera system according to claim 10, wherein
the first correction lens group includes a tilt correction lens group whose optical axis direction position is changed, and wherein
the control section acquires a position for the tilt correction lens group that improves the optical performance of entirety of the partial image and then controls the drive section such as to move the tilt correction lens group to the acquired position.

13. The camera system according to claim 10, wherein
the control section acquires the position for the first correction lens group that maximizes the optical performance of the partial image specified by the specification section and then controls the drive section such as to move the first correction lens group to the acquired position.

14. The camera system according to claim 10, wherein
the optical system further includes a diaphragm, and
in addition to the position information, the data table includes opening position information of the diaphragm.

15. The camera system according to claim 10, wherein
the optical performance is an MTF or a resolution.

16. The camera system according to claim 10, wherein
the specification section includes an image processing section cutting out and outputting the partial image of a predetermined area in the image and specifies the partial image within the area to be cut out by the image processing section.

17. The camera system according to claim 16, wherein
the camera body includes:
a display section displaying the image and the partial image; and
an operation section changing a position of the predetermined area in the image.

18. The camera system according to claim 10, wherein
the specification section includes a face detection section recognizing a face of a person from the image and then setting a face frame containing the recognized face and specifies the partial image within the face frame set up by the face detection section.

19. The camera system according to claim 10, wherein
the specification section includes a contrast detection section dividing the image into a plurality of areas and then detecting an area having a maximum contrast among the plurality of areas and specifies the partial image within the area detected by the contrast detection section.

* * * * *